(12) United States Patent
Singleton et al.

(10) Patent No.: US 12,214,881 B2
(45) Date of Patent: Feb. 4, 2025

(54) SECONDARY BARRIERS FOR USE WITH AIRCRAFT

(71) Applicant: The Boeing Company, Chicago, IL (US)

(72) Inventors: Christopher B. Singleton, Bothell, WA (US); Emmanuel A. Garcia, Mukilteo, WA (US); Joshua Yu-Hu Lee, Seattle, WA (US)

(73) Assignee: The Boeing Company, Arlington, VA (US)

( * ) Notice: Subject to any disclaimer, the term of this patent is extended or adjusted under 35 U.S.C. 154(b) by 168 days.

(21) Appl. No.: 17/752,688

(22) Filed: May 24, 2022

(65) Prior Publication Data

US 2023/0406505 A1 Dec. 21, 2023

(51) Int. Cl.
*B64D 11/00* (2006.01)
*B64C 1/14* (2006.01)
*B64D 45/00* (2006.01)

(52) U.S. Cl.
CPC ........ *B64D 11/0023* (2013.01); *B64C 1/1469* (2013.01); *B64D 45/0028* (2019.08)

(58) Field of Classification Search
CPC ............ B64D 11/0023; B64D 45/0028; B64C 1/1469; E05B 63/0008; E05B 65/087
See application file for complete search history.

(56) References Cited

U.S. PATENT DOCUMENTS

| 3,480,989 A | 12/1969 | Edeus |
| 4,597,549 A | 7/1986 | Ryan |
| 6,474,599 B1 * | 11/2002 | Stomski ................ B64C 1/1469 |
| | | 109/69 |

(Continued)

FOREIGN PATENT DOCUMENTS

| EP | 3943392 | 7/2021 |
| EP | 3964445 | 8/2021 |

(Continued)

OTHER PUBLICATIONS

Blog plot titled "Pocket Pet Gate" uploaded on May 4, 2021 by user "little house on a little land" (Amanda Stein). Retrieved from internet: <https://alittlehouse.wixsite.com/littlehouse.post/pocket-pet-gate> (Year: 2021).*

(Continued)

*Primary Examiner* — Tien Q Dinh
*Assistant Examiner* — Katherine June Bolek
(74) *Attorney, Agent, or Firm* — Hanley, Flight & Zimmerman, LLC

(57) ABSTRACT

Secondary barriers for aircraft are disclosed. An example secondary barrier includes a plurality of tracks to mount to a first monument in a cabin of an aircraft and a plurality of rods, where respective ones of the rods slidably engage respective ones of the tracks. The secondary barrier includes a panel coupled to respective ends of the rods. The rods to move relative to the tracks between a stowed position and a deployed position. The panel in the deployed position is to interface with a second monument in the cabin opposite the first monument. The rods are to extend between the first monument and the second monument when the secondary barrier is in the deployed position.

20 Claims, 16 Drawing Sheets

(56) References Cited

U.S. PATENT DOCUMENTS

| | | | |
|---|---|---|---|
| 6,523,779 B1 * | 2/2003 | Michel | B64D 11/0023 |
| | | | 49/404 |
| 6,696,979 B2 | 2/2004 | Manten et al. | |
| 6,817,577 B2 * | 11/2004 | Semprini | B64C 1/1469 |
| | | | 244/129.5 |
| 7,309,044 B2 | 12/2007 | Sprenger | |
| 8,925,863 B2 | 1/2015 | Pujol et al. | |
| 10,604,271 B2 | 3/2020 | Breigenzer | |
| 11,255,114 B2 * | 2/2022 | Konrad | E05B 83/40 |
| 2003/0006342 A1 | 1/2003 | Page, Jr. | |
| 2003/0169184 A1 | 9/2003 | Manten et al. | |
| 2004/0251384 A1 | 12/2004 | Sprenger | |
| 2005/0116098 A1 | 6/2005 | Martens et al. | |
| 2006/0000946 A1 | 1/2006 | Garofani et al. | |
| 2012/0211601 A1 | 8/2012 | Pujol et al. | |
| 2018/0265216 A1 | 9/2018 | Breigenzer | |
| 2021/0380216 A1 | 12/2021 | Leger et al. | |
| 2022/0073184 A1 | 3/2022 | Brewster | |

FOREIGN PATENT DOCUMENTS

| | | |
|---|---|---|
| EP | 39930344 | 5/2022 |
| WO | 2020259748 | 12/2020 |

OTHER PUBLICATIONS

European Patent Office, "Search Report and Written Opinion", issued in connection with EP Patent Application No. 23172526.8 on Sep. 25, 2023, 8 pages.

* cited by examiner

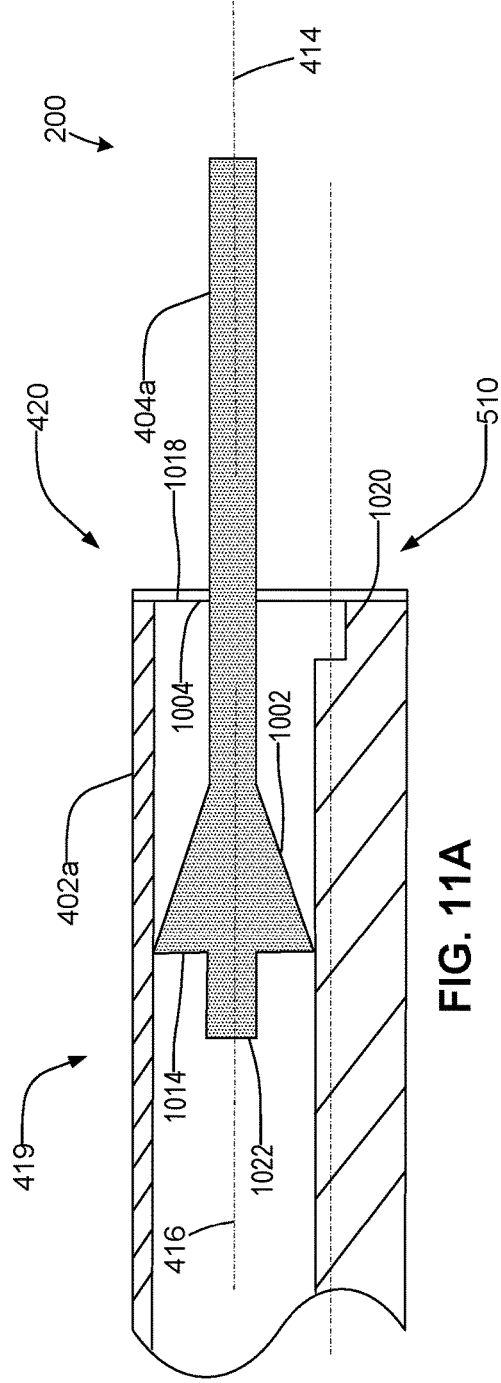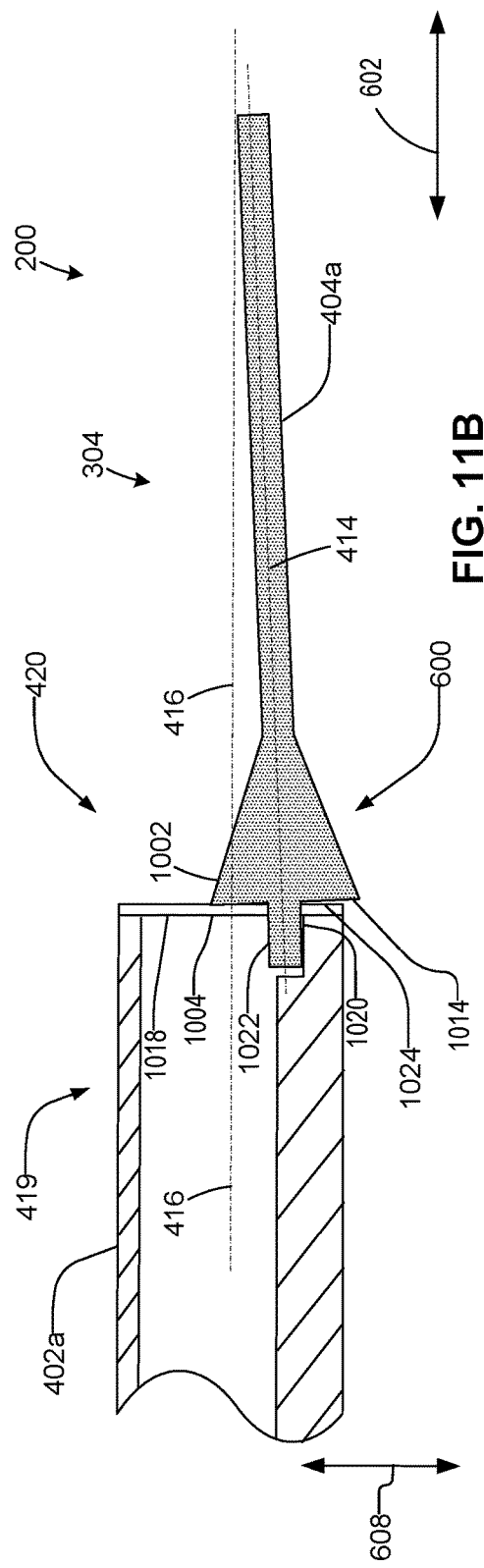

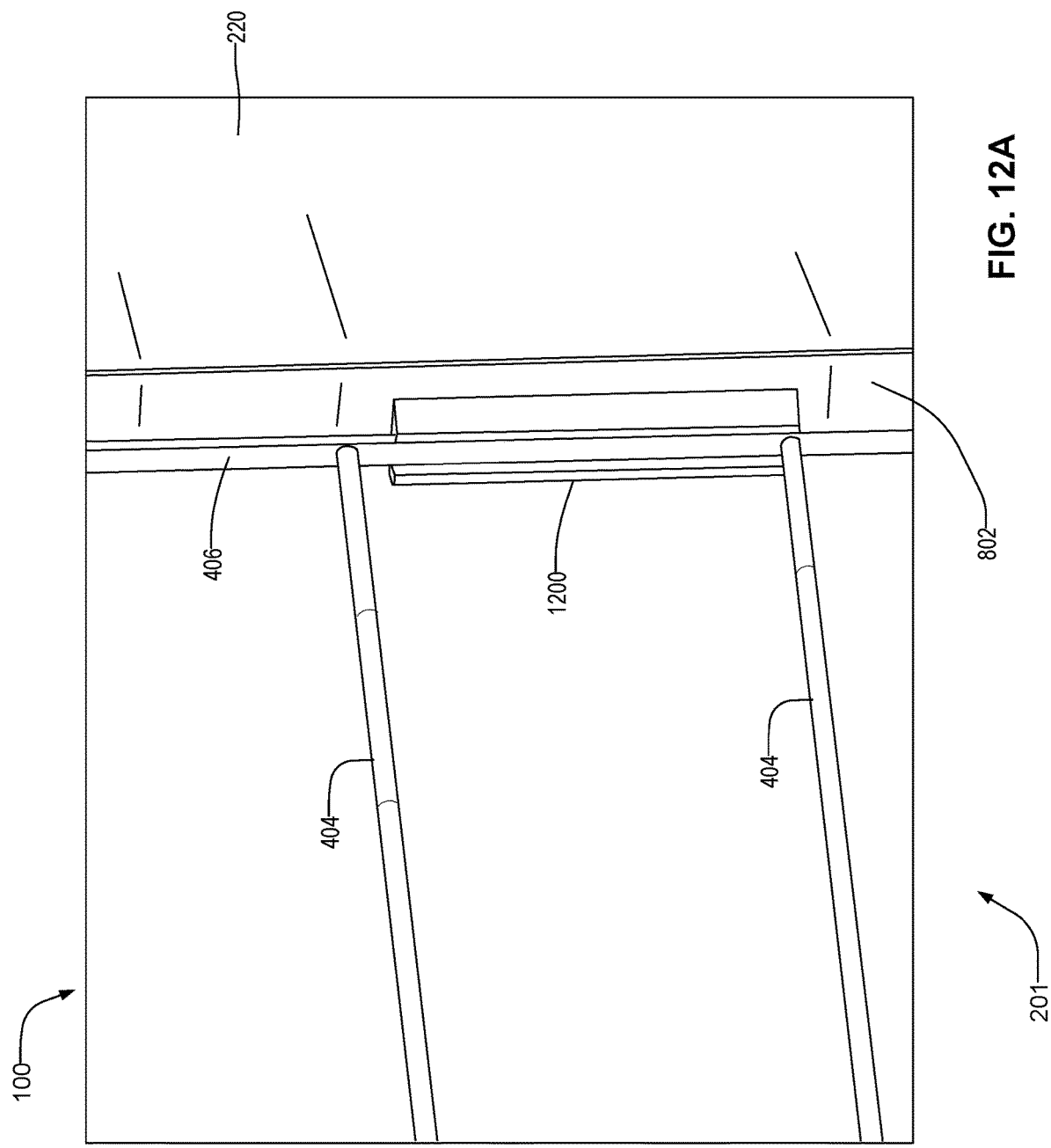

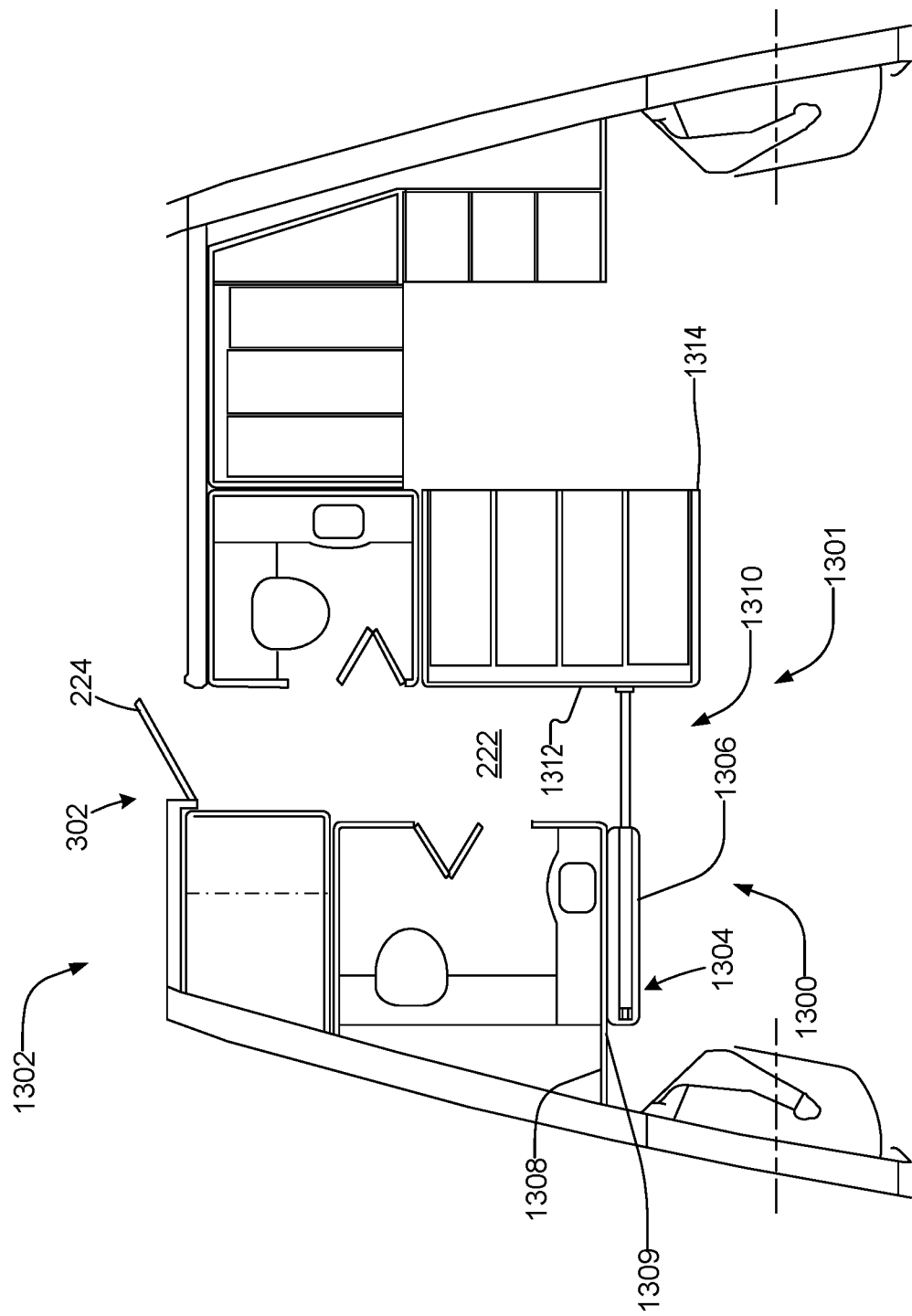

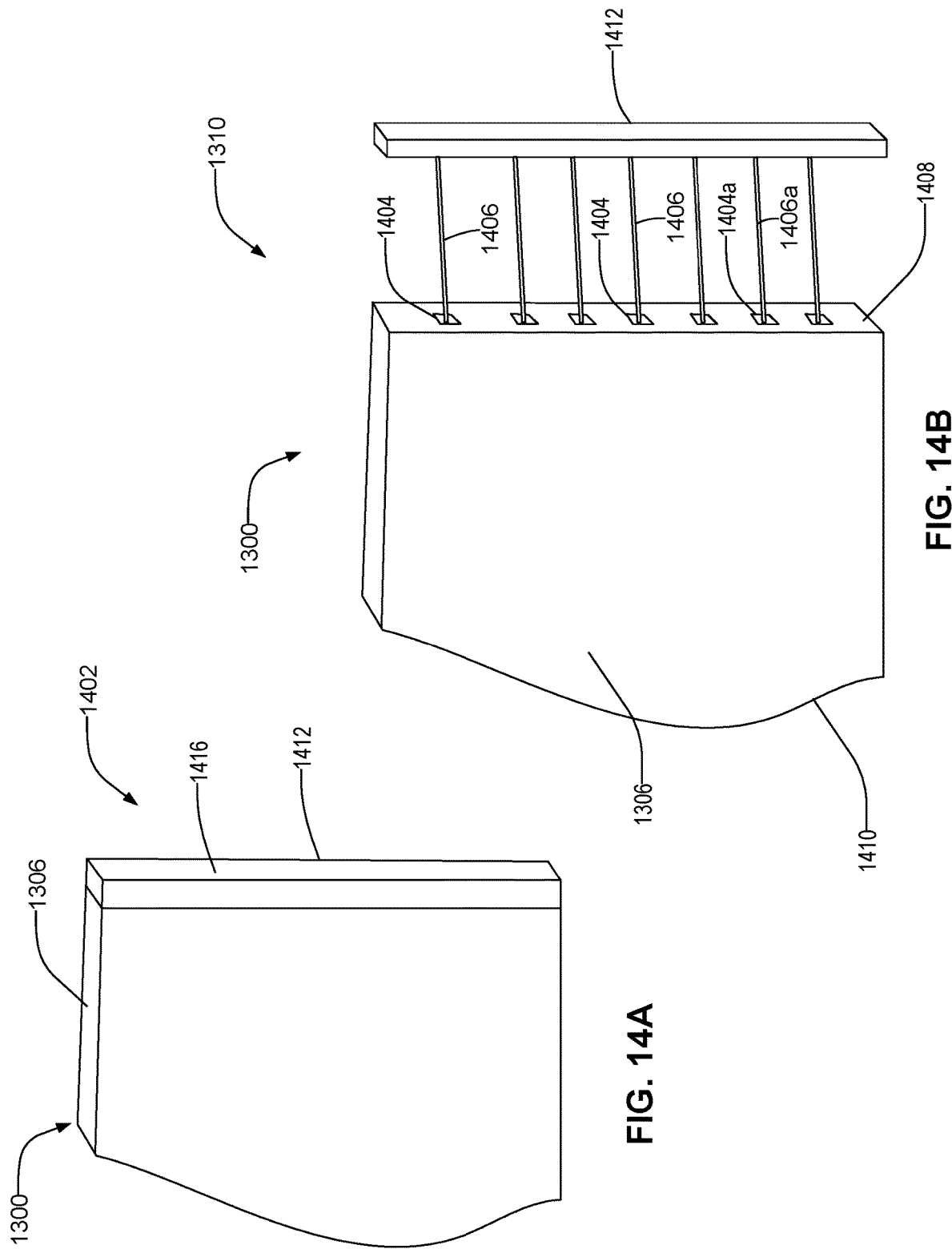

SECONDARY BARRIERS FOR USE WITH AIRCRAFT

FIELD OF DISCLOSURE

The present disclosure relates generally to aircraft and, more particularly, to secondary barriers for use with aircraft.

BACKGROUND

Commercial aircraft employ a cockpit door to provide a primary flight deck barrier between a cockpit of an aircraft and a passenger cabin. The cockpit door provides a barrier preventing unwanted entry into the cockpit during flight by non-authorized personnel.

SUMMARY

An example secondary barrier disclosed herein includes a plurality of tracks to mount to a first monument in a cabin of an aircraft and a plurality of rods, where respective ones of the rods slidably engage respective ones of the tracks. The secondary barrier includes a panel coupled to respective ends of the rods. The rods to move relative to the tracks between a stowed position and a deployed position. The panel in the deployed position is to interface with a second monument in the cabin opposite the first monument. The rods are to extend between the first monument and the second monument when the secondary barrier is in the deployed position.

An example secondary barrier includes a gate to be slidably coupled to a first wall of an aircraft cabin. The gate is movable between a deployed position and a stowed position. The gate includes a plurality of rails and a panel. The rails to be positioned inside the first wall of the aircraft cabin when the gate is in the stowed position. A retainer is to couple to a second wall. The panel is to interface with the retainer when the gate is in the deployed position. The retainer is to restrict movement of the gate in a direction non-parallel relative to a longitudinal axis of the rails.

An example method includes attaching a plurality of tracks to a surface defining a cavity of at least one of a housing or a first monument of an aircraft cabin; slidably coupling a plurality of rods to corresponding ones of the tracks; and coupling a panel to respective ends of the rods.

An example secondary barrier includes a housing defining a cavity. A plurality of tracks are positioned within the housing and a plurality of rods, where respective ones of the rods to slidably couple to respective ones of the tracks. A panel is coupled respective ends of the rods. The panel is to cause the rods to move between a stowed position and a deployed position. The rods in the stowed position are to be positioned entirely within the housing. The rods in the deployed position are to extend externally from the housing. The panel is to form an outer wall of the housing when the panel is in the stowed position.

Certain examples are shown in the above-identified figures and described in detail below. The features, functions and advantages that have been discussed can be achieved independently in various embodiments or can be combined in yet other embodiments further details of which can be seen with reference to the following description and drawings. The figures are not necessarily to scale and certain features and certain views of the figures may be shown exaggerated in scale or in schematic for clarity and/or conciseness. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

BRIEF DESCRIPTION OF THE DRAWINGS

FIG. 11A is a side, cross-sectional view of the example rail assembly of FIGS. 10A and 10B shown in an example unlocked position.

FIG. 11B is a side, cross-sectional view of the example rail assembly of FIGS. 10A and 10B shown in an example locked position.

FIG. 12A is a perspective view of an example retainer that can be used with the example secondary barrier of FIGS. 1-9, 10A, 10B, 11A and 11B.

FIG. 13 is a top, partial cutaway view of an example cabin of an example aircraft including another example secondary barrier disclosed herein.

FIG. 14A is a perspective view of the example secondary barrier of FIG. 13 shown in an example stowed position.

FIG. 14B is a perspective view of the example secondary barrier of FIG. 13 shown in an example deployed position.

Figure 1:
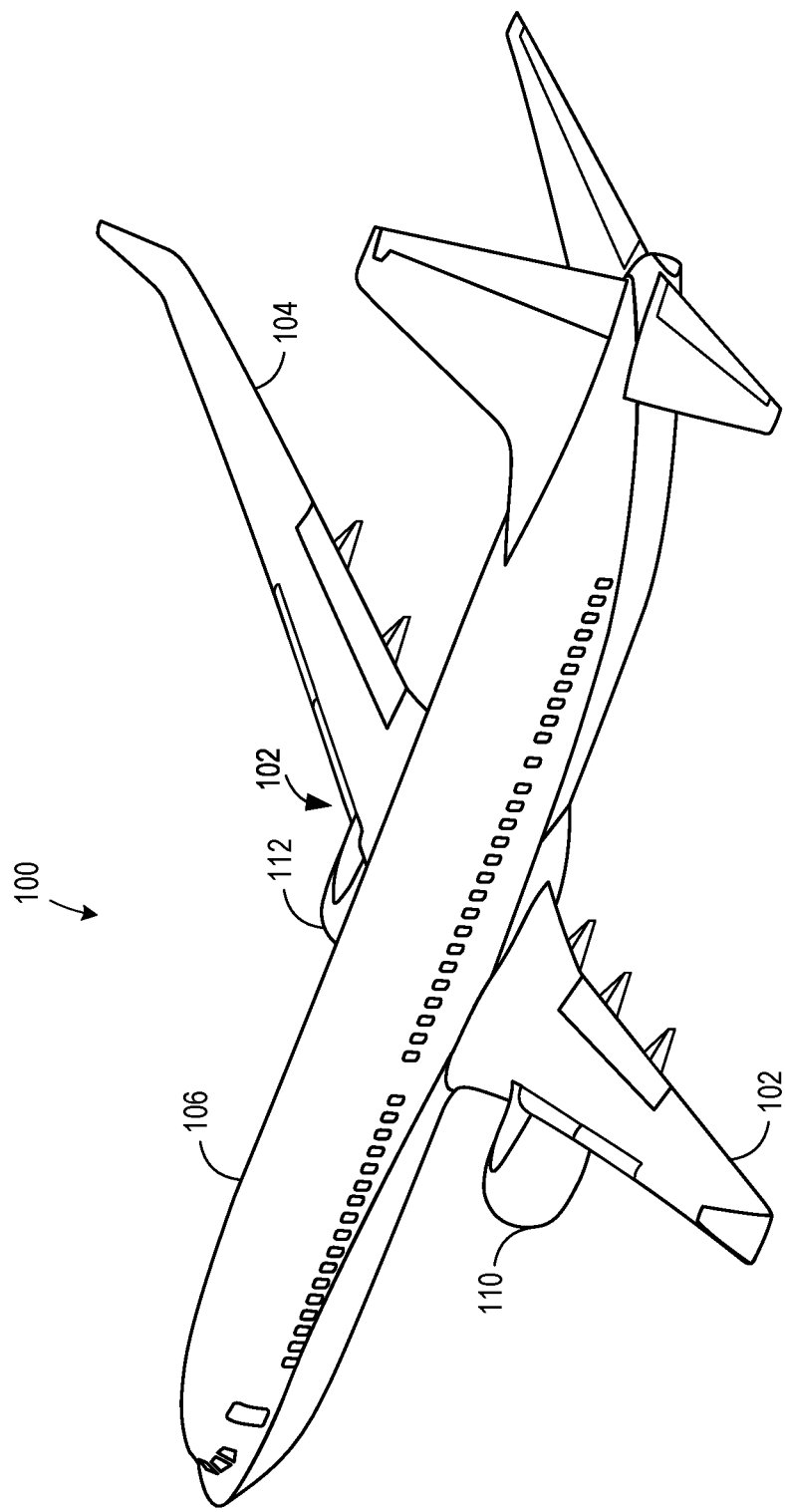
FIG. 1 is an illustration of an example aircraft having an example secondary barrier in accordance with teachings of this disclosure.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Aircraft employ a flight deck door as a primary barrier protecting a flight deck (e.g., a cockpit) from unauthorized entry and/or intrusion. For instance, in a closed position, the primary barrier is designed to effectively withstand attacks from intruders and/or unauthorized entry. Thus, the primary barrier provides a primary secured area (e.g., the flight deck) when the primary barrier is in a closed position. However, a security threat can be presented during flight when the primary barrier is an open position to allow entry and/or exit of authorized personnel between the flight deck and a passenger cabin of the aircraft (e.g., when a flight attendant brings food or beverages for the pilots, etc.), when the pilot(s) use the lavatory (which is located outside of the flight deck and shared with passengers), etc. Thus, in some instances, a primary barrier in an open position during flight can present a security risk.

To reduce security risks when the primary barrier is in an open position during flight, aircraft often employ a secondary barrier. The secondary barrier forms a secondary secured area between a cabin area in which passengers are present and the primary barrier (e.g., a flight deck door). The secondary secured area provided by the secondary barrier often includes one or more monuments of an aircraft such as, for example, a lavatory, a closet, a galley, and/or other amenities that can be used by pilots or other authorized personnel during flight when the secondary barrier is in a secured position.

Typically, the secondary barrier is a secondary door that is attached to a frame. The frame attaches to the side walls and a ceiling of the aircraft and remains visible when the secondary door is in an open position and a closed position. For instance, the frame includes a first side that attaches to a first monument (e.g., a first wall), a second side that attaches to a second monument (e.g., a second wall) opposite the first monument, and a third side interconnecting the first side and the second side that attaches to the ceiling. The secondary door pivotally couples to the first side of the frame via one or more hinges and latches with the second side of the frame when the secondary door is in the closed position. These secondary doors, although effective at providing a secondary barrier, are visible when not in use and are aesthetically unappealing. Additionally, the frame and doors add significant weight to the aircraft.

Example secondary flight deck barriers disclosed herein provide protection against security risks and significantly reduce weight compared to traditional secondary barriers. Additionally, example secondary flight deck barriers disclosed herein are not visible when stowed or not in use (e.g., in a closed position). Specifically, example secondary flight deck barriers disclosed herein are embedded or integrated in a structural component of the aircraft. In some examples, the secondary barriers disclosed herein are formed with and/or coupled to a wall or monument of the aircraft cabin. Example secondary barriers disclosed herein provide a slide out gate movable between a use or deployed position and a non-use or stowed position relative to the a structural component (e.g., a monument or wall) of the aircraft to which the secondary flight deck barrier is coupled.

FIG. 1 illustrates an example aircraft 100 that can be implemented with a secondary barrier system in accordance with teachings of this disclosure. The aircraft 100 of the illustrated example includes a first aircraft wing 102 (e.g., a first airfoil) and a second aircraft wing 104 (e.g., a second airfoil) that extend from a fuselage 106. A first aircraft engine 110 is supported by the first aircraft wing 102 and a second aircraft engine 112 is supported by the second aircraft wing 104.

Figure 2:
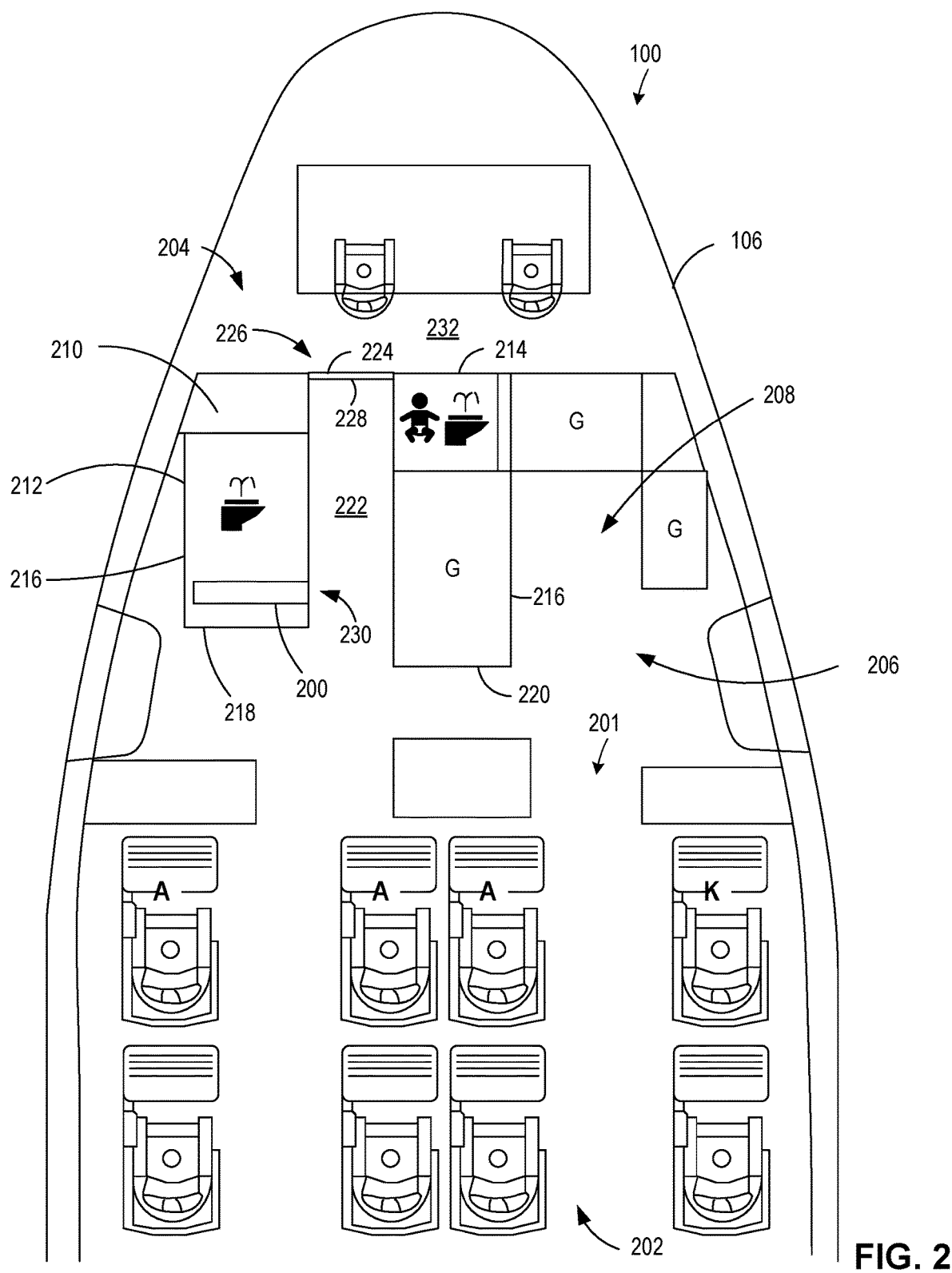
FIG. 2 is top, partial cutaway view of the example aircraft of FIG. 1 with an example primary barrier in a closed position and the example secondary barrier in an example stowed position.

FIG. 2 is a top, partial cutaway view of an example interior or cabin 201 of the fuselage 106 of the aircraft 100 of FIG. 1. The fuselage 106 of the illustrated example is implemented with an example secondary barrier 200 disclosed herein. The fuselage 106 of the illustrated example includes a passenger area 202 (e.g., a passenger cabin), a flight deck 204 and a crew area 206 between the passenger area 202 and the flight deck 204. The crew area 206 includes a galley 208, a closet 210, a first lavatory 212, a second lavatory 214 (e.g., an infant changing area) and/or other amenities that can be used by the flight crew and/or pilots. The crew area 206 is defined by a plurality of monuments 216 that include walls, cabinets, etc. Specifically, a first monument 218 and a second monument 220 form an aisle 222 that provides a pathway between the flight deck 204, the crew area 206 and the passenger area 202. The aisle 222 provides passengers located in the passenger area 202 access the crew area 206 to use one or more amenities located in the crew area 206. Additionally, the aisle 222 provides access between the crew area 206 and the flight deck 204. The first monument 218 of the illustrated example is a cabinet, wall, and/or other structure in the cabin 201. Specifically, the first monument 218 is at least partially in the crew area 206.

To restrict unauthorized access to the flight deck 204 during flight (e.g., via the aisle 222), the aircraft 100 of the illustrated example includes a first or primary barrier 224. As shown in the illustrated example, the primary barrier 224 is in an example closed position 226. During flight, the primary barrier 224 is typically in the closed position 226. The primary barrier 224 of the illustrated example is a flight deck door 228 that protects the flight deck 204 (e.g., a cockpit) from unauthorized entry and/or intrusion. For instance, the flight deck door 228 is designed to effectively withstand attacks from intruders and/or unauthorized entry into the flight deck 204. In other words, the primary barrier 224 (e.g., the flight deck door 228) provides a primary secured area 232 (e.g., the flight deck) when the primary barrier 224 is in the closed position 226. Passengers in the passenger area 202 are prevented or restricted from accessing the flight deck 204 via the primary barrier 224. When the primary barrier 224 is in the closed position 226, the secondary barrier 200 can be positioned in a stowed position 230 as shown in FIG. 2 to allow access to amenities of the crew area 206 via the aisle 222. In other words, when the secondary barrier 200 is in the stowed position 230, passengers from the passenger area 202 can move freely into the aisle 222 to use the first lavatory 212, the second lavatory 214, and/or any other amenities in the crew area 206.

Figure 3:
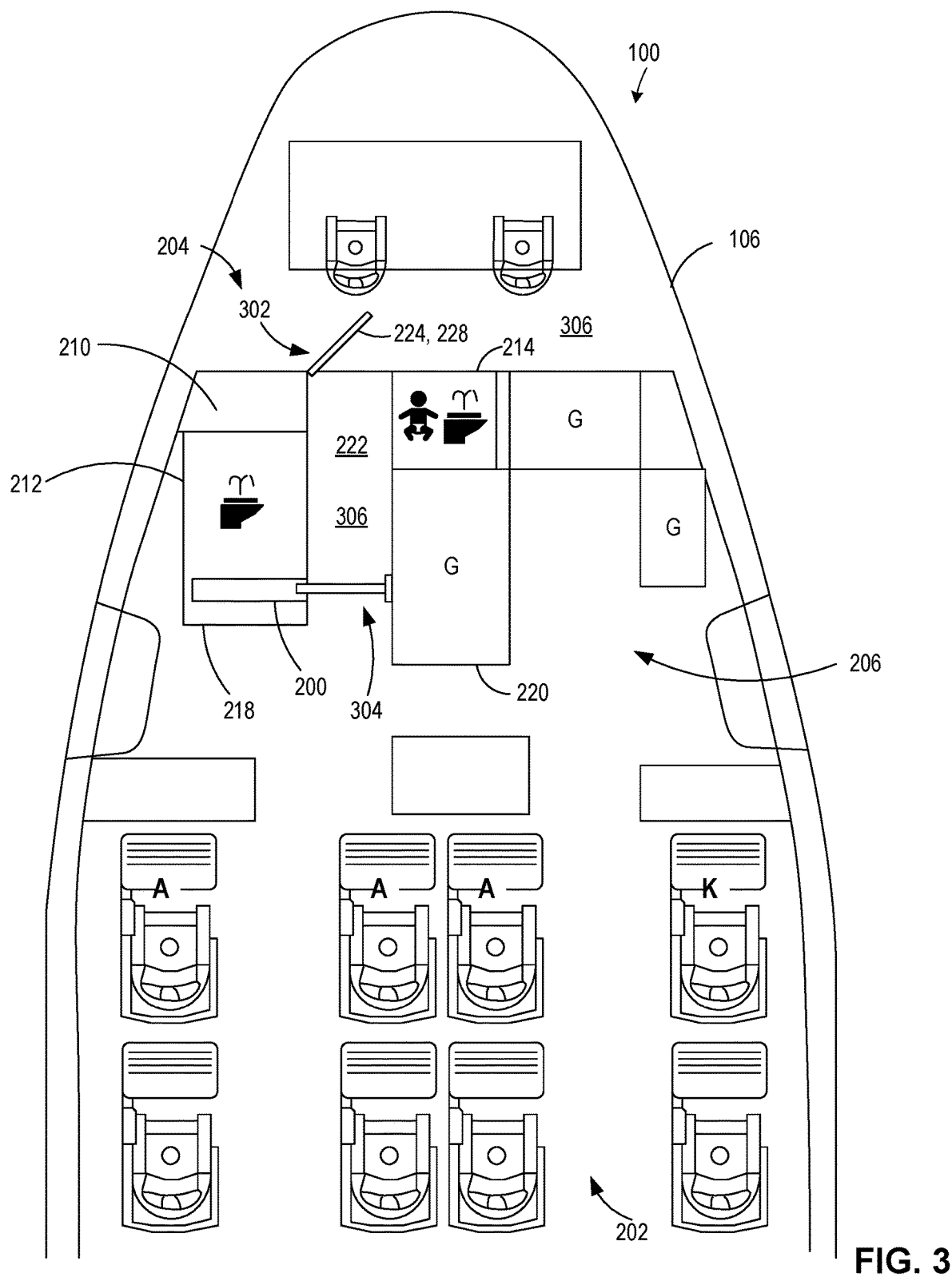
FIG. 3 is a top, partial cutaway view of the example aircraft of FIGS. 1 and 2 with the example primary barrier in an example open position and the example secondary barrier in an example deployed position.

FIG. 3 is a partial, cutaway view of the example aircraft 100 similar to FIG. 2 but shown with the primary barrier 224 in an example open position 302 and the secondary barrier 200 in an example deployed position 304. During flight, the primary barrier 224 (e.g., the flight deck door 228) can move to the open position 302 to allow flight deck crew in the flight deck 204 access to the crew area 206. However, when the primary barrier 224 is the open position 302 to allow entry and/or exit of authorized personnel between the flight deck 204 and the crew area 206, the flight deck 204 can be exposed to the passenger area 202 of the aircraft 100. Thus, moving the primary barrier 224 to the open position 302 during flight can cause a security risk in some instances.

To prevent or reduce a security risk when the primary barrier 224 is in the open position 302, the aircraft 100 of the illustrated example includes the secondary barrier 200. The secondary barrier 200 of the illustrated example is formed with or coupled to the first monument 218. Specifically, the secondary barrier 200 of the illustrated example is slidably coupled to the first monument 218 and extends across the aisle 222 to engage the second monument 220 when the secondary barrier 200 is in the deployed position 304. In some examples, the secondary barrier 200 can be slidably coupled to the second monument 220 and extends across the aisle 222 to engage the first monument 218 in a deployed position.

As described in greater detail below, the secondary barrier 200 extends across the aisle 222 between the first monument 218 and the second monument 220 to block or restrict access to the flight deck 204 via the aisle 222 (e.g., to prevent unauthorized access to the flight deck 204 when the primary barrier 224 is in the open position 302). Thus, the secondary barrier 200 forms a secondary secured area 306 between the passenger area 202 in which passengers can be present and the crew area 206 (e.g., when the primary barrier 224 is in the open position 302). In other words, the secondary secured area 306 includes the flight deck 204 and at least a portion of the aisle 222 of the crew area 206 leading to the primary barrier 224 and the flight deck 204. The secondary barrier 200 secures (e.g., isolates) the flight deck 204 from the passenger area 202. Thus, the secondary barrier 200 eliminates or prevents security risks and/or enables flight crew and/or other authorized personnel to use the first lavatory 212, the closet 210 and/or other amenities during flight when the secondary barrier 200 is in the deployed position 304 and the primary barrier 224 is in the open position 302. In some examples, the secondary barrier 200 can be positioned to the deployed position 304 when the primary barrier 224 is in the closed position 226 (FIG. 2) to prevent or restrict access to the crew area 206 via the aisle 222.

Figure 4:
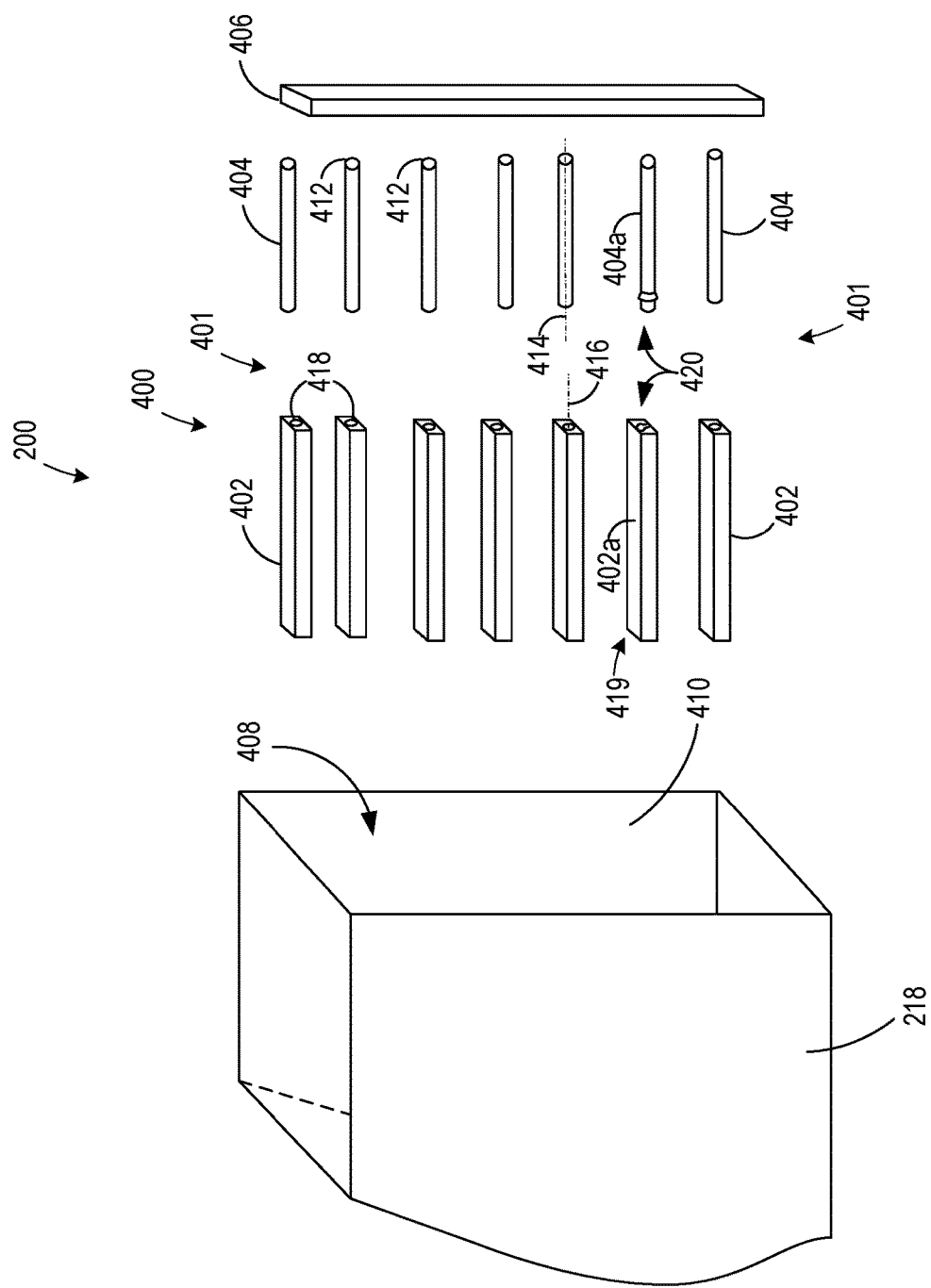
FIG. 4 is an exploded view of the example secondary barrier of FIGS. 1-3.

FIG. 4 is an exploded view of the example secondary barrier 200 disclosed herein. The secondary barrier 200 of the illustrated example is a gate 400. Specifically, the gate 400 of the illustrated example is to be slidably coupled to the first monument 218 of the cabin 201. In some examples, the secondary barrier 200 can be slidably coupled to the second monument 220 (FIG. 2) and/or any other monument or structure of the aircraft 100. The secondary barrier 200 of the illustrated example includes a plurality of rail assemblies 401. The rail assemblies 401 include a plurality of tracks 402 (e.g., rails) and a plurality of rods 404. The secondary barrier 200 includes a panel 406. The tracks 402 are to mount to the first monument 218 of the passenger area 202. For example, the tracks 402 of the illustrated example are coupled to (e.g., mounted in) an internal cavity 408 defined by an inner surface 410 of the first monument 218. In some examples, the tracks 402 of the illustrated example can be fixed or mounted to the inner surface 410 via one or more fasteners (e.g., L-brackets, mounting brackets, clips, bolts, screws, clamps, and/or any other suitable fastener(s). In some examples, the tracks 402 can be integrally formed with the first monument 218. For instance, the tracks 402 can be formed by cutting slots, openings, channels and/or any other apertures in the first monument 218. For example, the first monument 218 can be a solid structure (e.g., a solid wall formed without an internal cavity 408) and the tracks 402 can be defined by a plurality of apertures or openings formed in the solid structure of the first monument 218.

The rods 404 of the illustrated example slidably couple to the tracks 402. For instance, respective ones of the rods 404 slidably couple or slidably engage respective ones of the tracks 402. The panel 406 is coupled (e.g., fixed) to respective ends 412 of the rods 404. For example, the panel 406 can be welded, fastened and/or integrally formed with the respective ends 412 of the rods 404. Thus, the rods 404 and the panel 406 move relative to the tracks 402. In this manner, movement of the panel 406 causes movement of the rods 404 relative to the tracks 402. The panel 406 of the illustrated example is a metallic strip cap. The tracks 402 and the rods 404 can be composed of metal, aluminum, titanium, plastic, alloy and/or any other material(s).

The tracks 402 of the illustrated example guide the rods 404 during movement. For example, the tracks 402 maintain a longitudinal axis 414 of the rods 404 in substantial alignment (e.g., horizontal or parallel alignment) with a longitudinal axis 416 of the tracks 402. In other words, the tracks 402 maintain the longitudinal axis 414 of the rods 404 substantially parallel relative to the longitudinal axis 416 of the tracks 402. As used herein, substantially parallel means perfectly parallel (e.g., zero degrees of deviation between the longitudinal axis 414 and the longitudinal axis 416) and almost perfectly parallel (e.g., between 0.1 and 5 degrees of deviation between the longitudinal axis 414 and the longitudinal axis 416). For instance, in the orientation of FIG. 4, the longitudinal axis 414 and the longitudinal axis 416 are horizontal relative to the ground. Each of the tracks 402 of the illustrated example has a rectangular cross-sectional shape. In the illustrated example, the tracks 402 include a plurality of openings 418 to slidably receive the rods 404. Each opening 418 has a circular cross-sectional shape. Each of the rods 404 of the illustrated example has a circular cross-sectional shape to interface with the openings 418 of the tracks 402. For example, a diameter of each of the rods 404 is smaller than a diameter of each of the openings 418. In other examples, the tracks 402, the openings 418 and/or the rods 404 can have a square cross-sectional shape and/or any other cross-sectional shape.

As discussed in greater detail below, a first rail assembly 419 of the secondary barrier 200 includes a lock 420. The lock 420 is to prevent movement of the secondary barrier 200 (e.g., and/or the rods 404 relative to the tracks 402) when the secondary barrier 200 is in the deployed position 304. The lock 420 of the illustrated example is formed by an interface between a first track 402a and a first rod 404a of the first rail assembly 419. In some examples, a second rail assembly 422 can include a lock (e.g., the lock 420). In some examples, a third rail assembly and/or any number of rail assemblies 401 can include locks.

Figure 5:
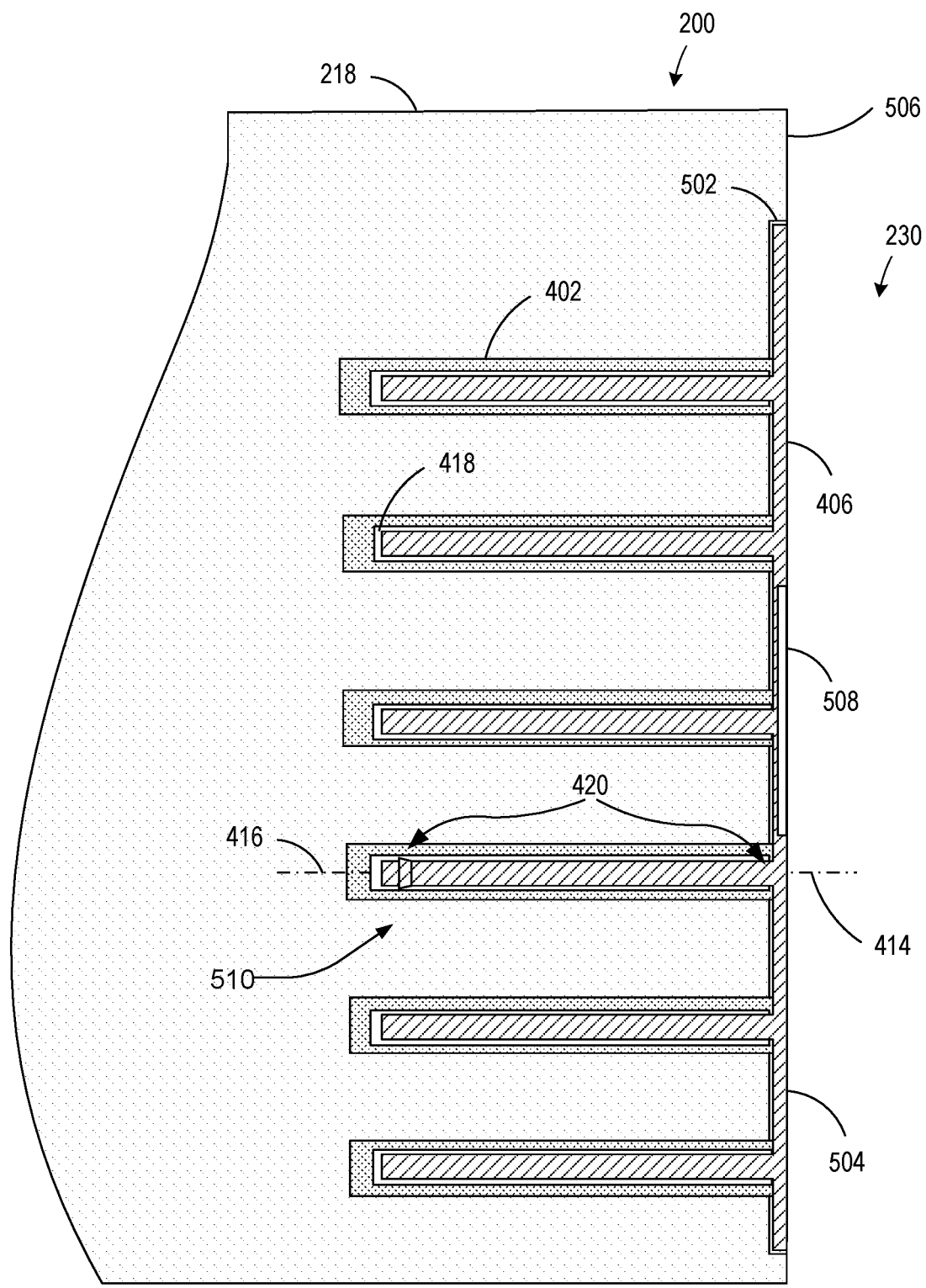
FIG. 5 is a side, cross-sectional view of the example secondary barrier of FIGS. 1-4 shown in the example stowed position.

FIG. 5 is a cross-sectional side view of the secondary barrier 200 shown in the stowed position 230. In the stowed position 230, a respective one of the rods 404 is positioned (e.g., fully or completely positioned) in the opening 418 of a respective one of the tracks 402. The tracks 402 maintain the rods 404 substantially parallel relative to the tracks 402 such that the longitudinal axis 414 of respective ones of the rods 404 is aligned (e.g., coaxially aligned) with the longitudinal axis 416 of respective ones of the tracks 402. Additionally, the panel 406 of the illustrated example is recessed relative to the first monument 218. For example, the first monument 218 includes a slot 502 to receive the panel 406. In this manner, an outer surface 504 of the panel 406 is flush or aligned with a first wall or an outer surface 506 of the first monument 218. To move the secondary barrier 200, the panel 406 of the illustrated example includes a grip or handle 508. The handle 508 of the illustrated example is a recess or recessed pocket formed in the panel 406 so that the handle 508 does not protrude outwardly or away from the outer surface 504 of the panel 406 (e.g., in a direction away from the rods 404 or the tracks 402). Thus, the outer surface 504 of the panel 406 has a substantially flat surface. In the illustrated example, the lock 420 is in an unlocked position 510 to enable movement of the secondary barrier 200 to the deployed position 304.

Figure 6:
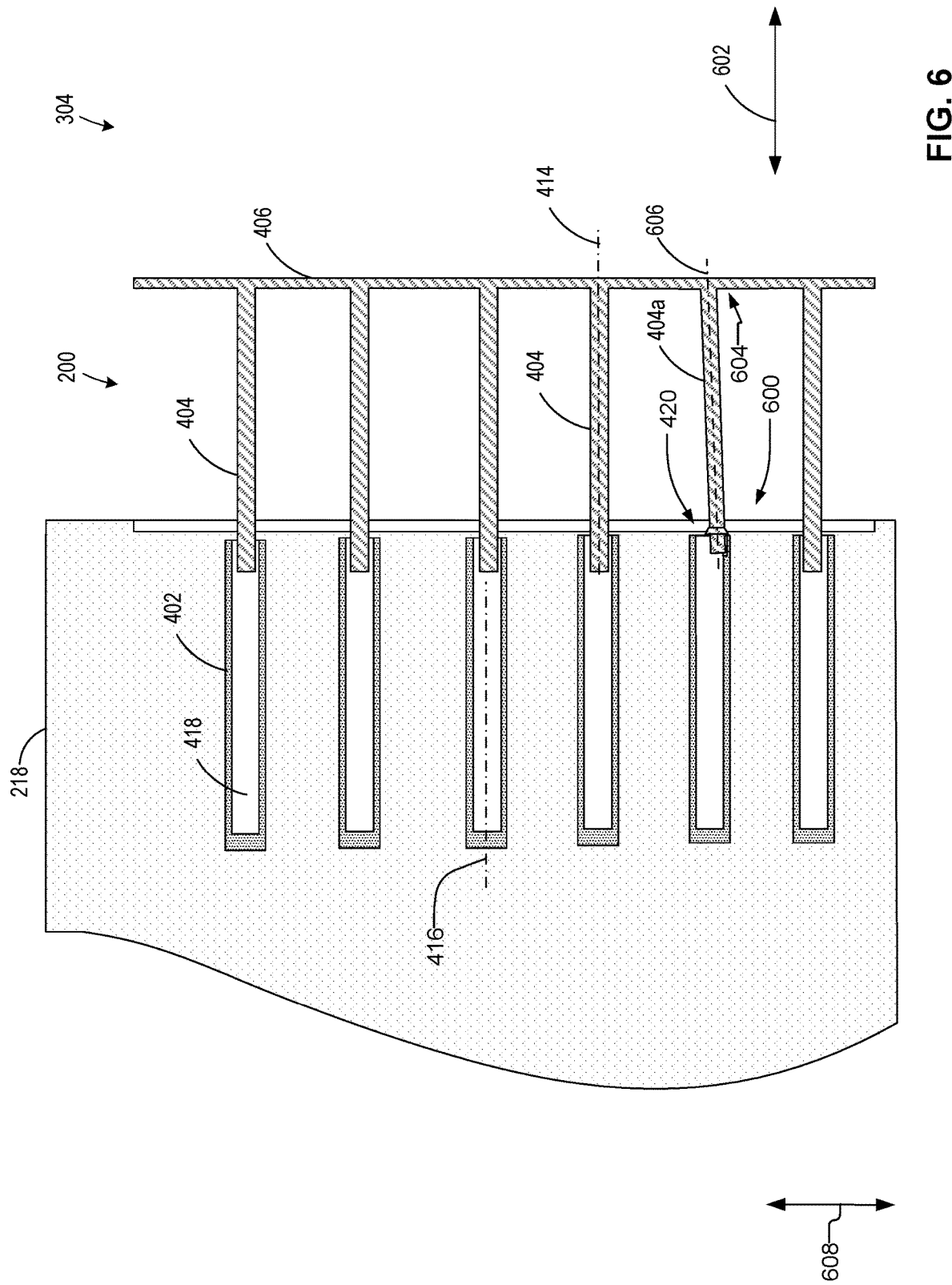
FIG. 6 is a side, cross-sectional view of the example secondary barrier of FIGS. 1-5 shown in the example deployed position.

FIG. 6 is a cross-sectional side view of the secondary barrier 200 disclosed herein shown in the deployed position 304. In the deployed position 304, the panel 406 and the rods 404 extend from (e.g., the openings 418 of) the tracks 402 and/or from the first monument 218. For instance, the rods 404 and/or the panel 406 extend in a direction (e.g., in a sideways direction 602) away from the first monument 218 and the tracks 402. The sideways direction 602 of the illustrated example is a direction along (e.g., a direction substantially parallel relative to) the longitudinal axis 416 of the tracks 402. For instance, movement of the panel 406 away from the first monument 218 causes the rods 404 to move in a direction away from the tracks 402 along the longitudinal axis 416. In other words, the rods 404 at least partially extend (e.g., extract) from the openings 418 of the tracks 402.

In the deployed position 304 of the illustrated example, the lock 420 is in a locked position 600 to prevent movement of the secondary barrier 200 from the deployed position 304 to the stowed position 230. In other words, the lock 420 prevents movement of the rods 404 relative to the tracks 402 from the deployed position 304 to the stowed position 230 when the lock 420 is in the locked position 600. To enable the lock 420 to move to the locked position 600, (e.g., an end of) the first rod 404a of the illustrated example is pivotally coupled to the panel 406 via a pivot 604 (e.g., a pivot joint, a ball joint, etc.). The pivot 604 enables the first rod 404a to pivot relative to the panel 406 such that a longitudinal axis 606 of the first rod 404a is angled relative to the longitudinal axis 414 of the rods 404 that do not include the lock 420. In other words, the longitudinal axis 606 of the first rod 404a when the first rod 404a is in the deployed position 304 is angled relative to the longitudinal axis 414 of the first rod 404a when the first rod 404a is in the stowed position 230. Thus, the first rod 404a, via the pivot 604, enables at least a portion of the rod to move in a direction 608 in the orientation of FIG. 6 (e.g., a vertical direction, or a non-parallel or a perpendicular direction relative to the sideways direction 602).

Thus, the lock 420 is movable between the locked position 600 and the unlocked position 510. In the illustrated example, the lock 420 automatically moves to the locked position 600 when the secondary barrier 200 is in the deployed position 304. However, the lock 420 is to be moved manually from the locked position 600 to the unlocked position 510 when the secondary barrier 200 moves from the deployed position 304 to the stowed position 230.

The lock 420 is inconspicuous or concealed from view when the secondary barrier 200 is in the deployed position 304 as shown in FIG. 6. For example, the first rod 404a has a slight taper of between approximately 0.5 degrees and 5 degrees from horizontal. This gradual taper can be difficult to detect by the human eye. Thus, although the first rod 404a may not be perfectly parallel relative to the other rods 404, the first rod 404a can be indistinguishable from the other rods 404 when in the lock 420 is in the locked position. In some examples, a brush seal or other seal or cap can be positioned within the slot 502 to conceal the location of the lock. Such a seal can prevent identification of a location of the lock 420 (e.g., the first rod 404a) by a passenger in the passenger area 202. Thus, only authorized personnel would be able to determine which one of the rods 404 includes the lock 420.

In some examples, a control system can be employed to automatically move the secondary barrier 200 between the deployed position 304 and the stowed position 230. In some examples, the control system can be employed to move the secondary barrier 200 between the stowed position 230 and the deployed position 304 based on a position of the primary barrier 224. Additional details of how the lock 420 moves between the locked position 600 and the unlocked position 510 are described below in FIGS. 10A, 10B, 11A and 11B.

Figure 7:
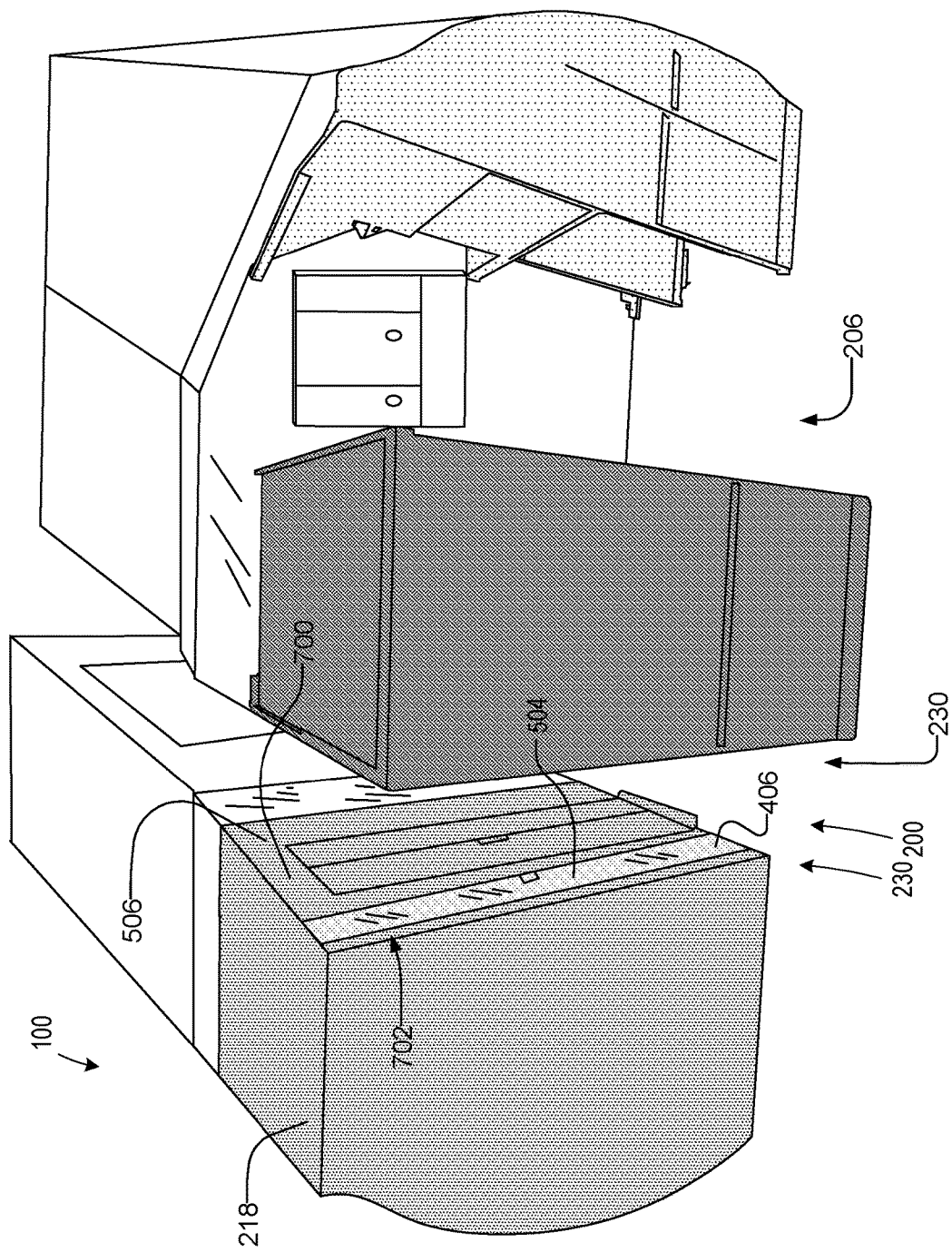
FIG. 7 is a partial, perspective view of an example cabin of the example aircraft of FIGS. 1-3.

FIG. 7 is partial, perspective view of the example crew area 206 of FIG. 2 with the secondary barrier 200 shown in the example stowed position 230. In the stowed position 230, the secondary barrier 200 is positioned within the first monument 218 of the crew area 206. Specifically, the rods 404 are positioned inside the first monument 218 when the secondary barrier 200 is in the stowed position 230. For instance, the rods 404 and the tracks 402 are completely positioned within the first monument 218 and are not visible to passengers in the passenger area 202 (FIG. 2). In some examples, the only portion of the secondary barrier 200 that is visible to passengers in the passenger area 202 when the secondary barrier 200 is in the stowed position 230 is the outer surface 504 of the panel 406. In other words, the secondary barrier 200 is hidden from view when in the stowed position 230 and, thus, is aesthetically appealing.

The panel 406 of the illustrated example is flush relative to the outer surface 506 of the first monument 218. In this manner, the outer surface 504 of the panel 406 and the outer surface 506 of the first monument 218 form a substantially continuous overall outer surface or first wall 700 (e.g., an outer wall) when the secondary barrier 200 is in the stowed position 230. As used herein, "substantially continuous" means that the outer surface 504 of the panel 406 and the first wall 700 of the first monument 218 do not form a raised surface or discontinuous surface at or across an interface 702 between the panel 406 and the first monument 218. In other words, the outer surface 506 of the first monument 218 and the outer surface 504 of the panel 406 define the first wall 700 of the first monument 218. Thus, the panel 406 is to define at least a portion of the first wall 700 of the first monument 218 when the secondary barrier 200 is in the stowed position 230. In the stowed position 230, the secondary barrier 200 enables access to the crew area 206 via the aisle 222.

Figure 8:
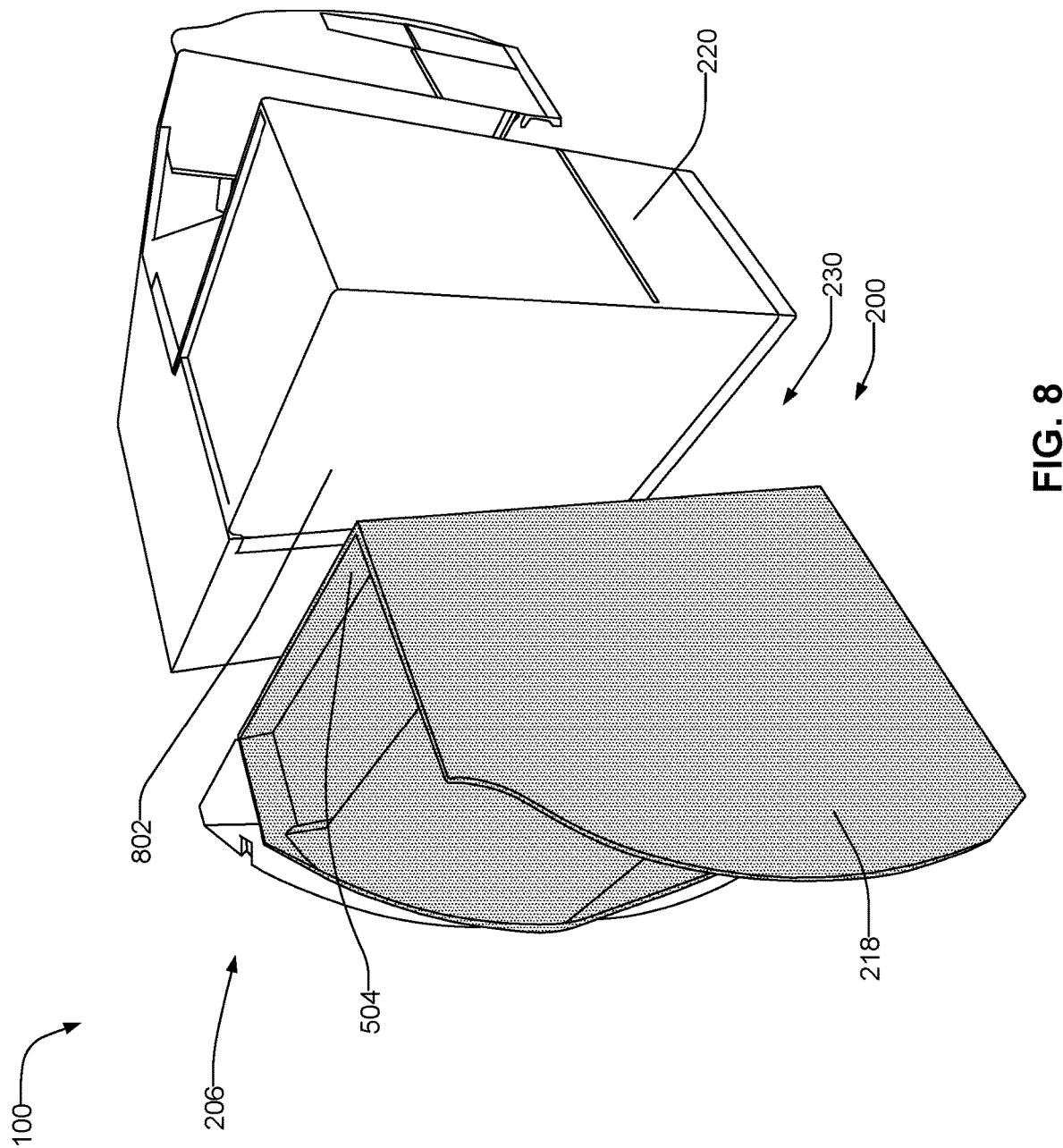
FIG. 8 is another partial, perspective view of the example cabin of the example aircraft of FIGS. 1-3.

FIG. 8 is another partial, perspective view of the crew area 206 of the example aircraft 100 of FIGS. 1-7. Specifically, a second surface or second wall 802 of the second monument 220 of the crew area 206 is shown in FIG. 8. The second wall 802 of the second monument 220 is opposite the outer surface 506 of the first monument 218. In the deployed position 304, the secondary barrier 200 engages the second surface of the second monument 220.

Figure 9:
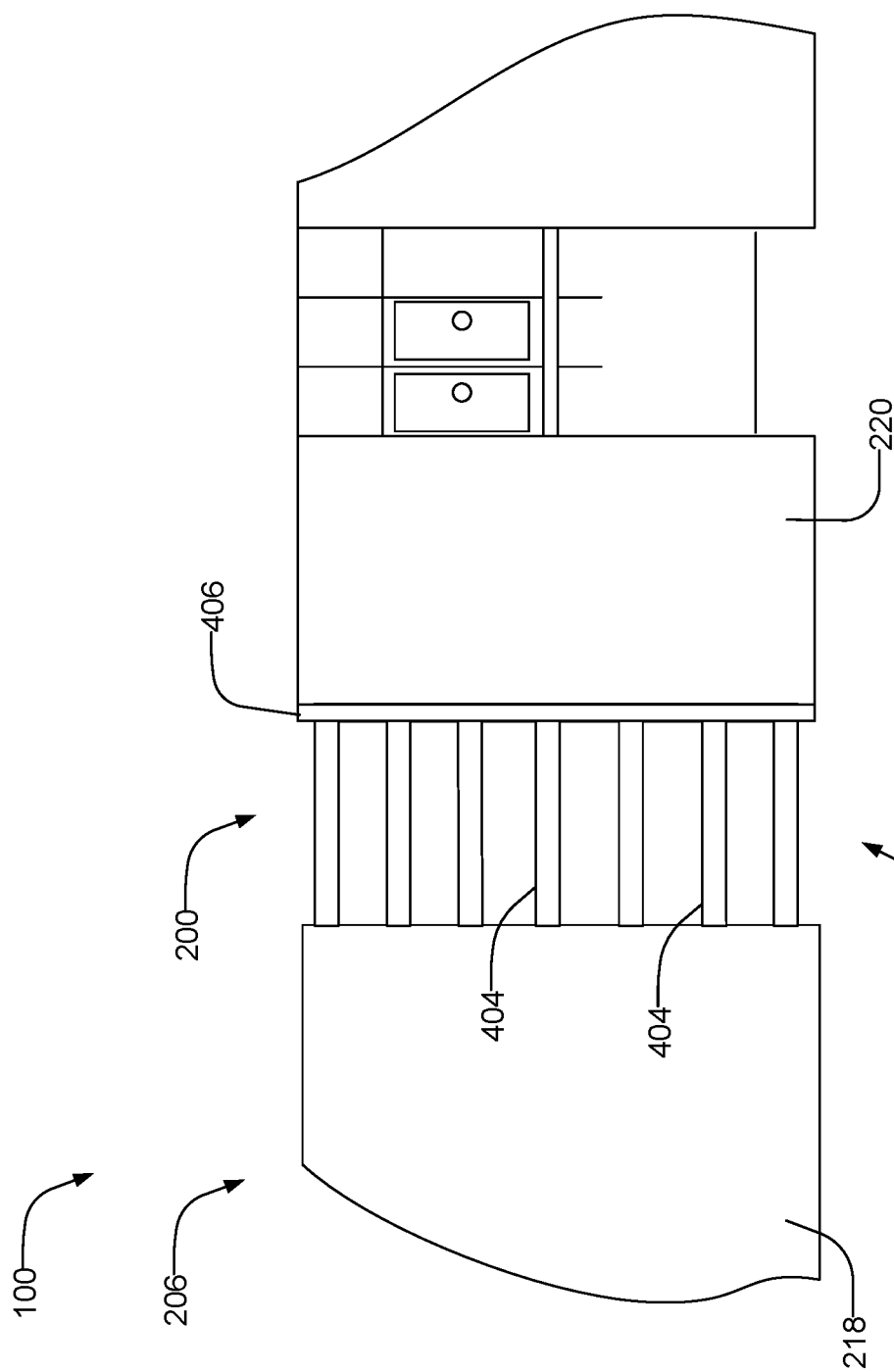
FIG. 9 is a side view of the example cabin of FIGS. 1-3, 7 and 8 with the example secondary barrier in the example deployed position.

FIG. 9 is a side view of the example crew area 206 with the secondary barrier 200 shown in the deployed position 304. As noted above, the secondary barrier 200 is movable relative to the first monument 218 between the deployed position 304 and the stowed position 230. Specifically, the secondary barrier 200 is to extend between the first wall 700 (FIG. 7) or the outer surface 506 of the first monument 218 and the second wall 802 (FIG. 8) opposite the first wall 700.

In the deployed position 304, the panel 406 interfaces with the second monument 220 opposite the first monument 218. In the deployed position 304, the rods 404 extend between the first monument 218 and the second monument 220. The second wall 802 provides a brace for the panel 406 when the secondary barrier 200 is in the deployed position 304. In other words, the secondary barrier 200 (e.g., the gate 300) extends between the first monument 218 and the second monument 220 to block access to the primary barrier 224 via the aisle 222. As further described in FIGS. 10A, 10B, 11A and 11B, the lock 420 prevents movement of the secondary barrier 200 between the deployed position 304 and the stowed position 230 when the lock 420 is in the locked position 600 (FIG. 6).

Figure 10A:
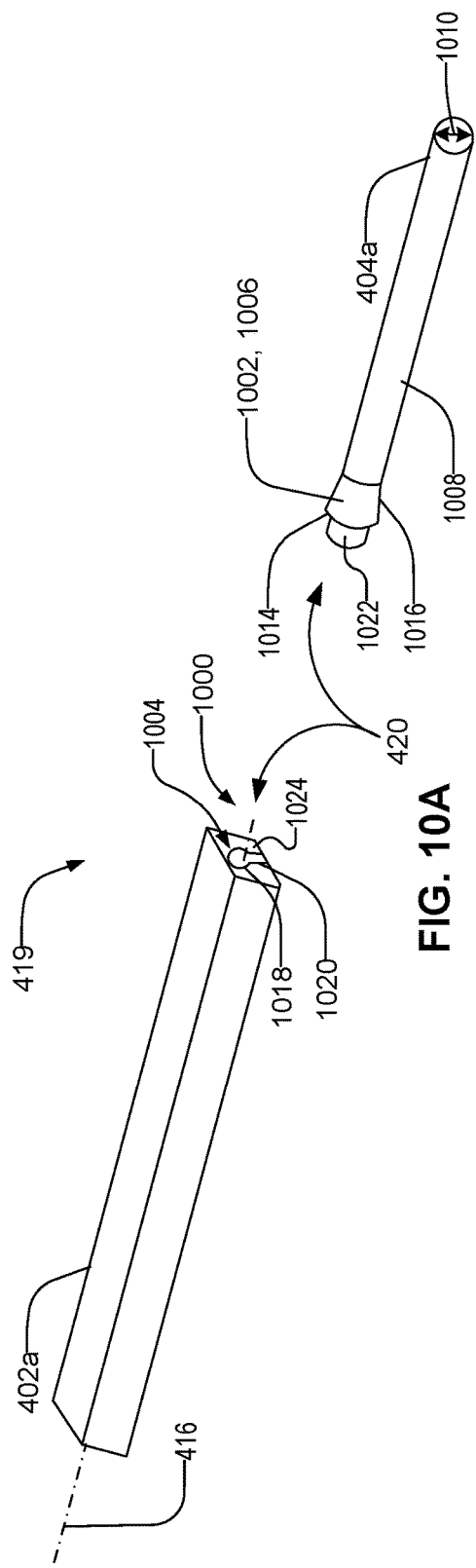
FIG. 10A is an exploded, perspective view of an example rail assembly of the example secondary barrier of FIGS. 1-9.
Figure 10B:
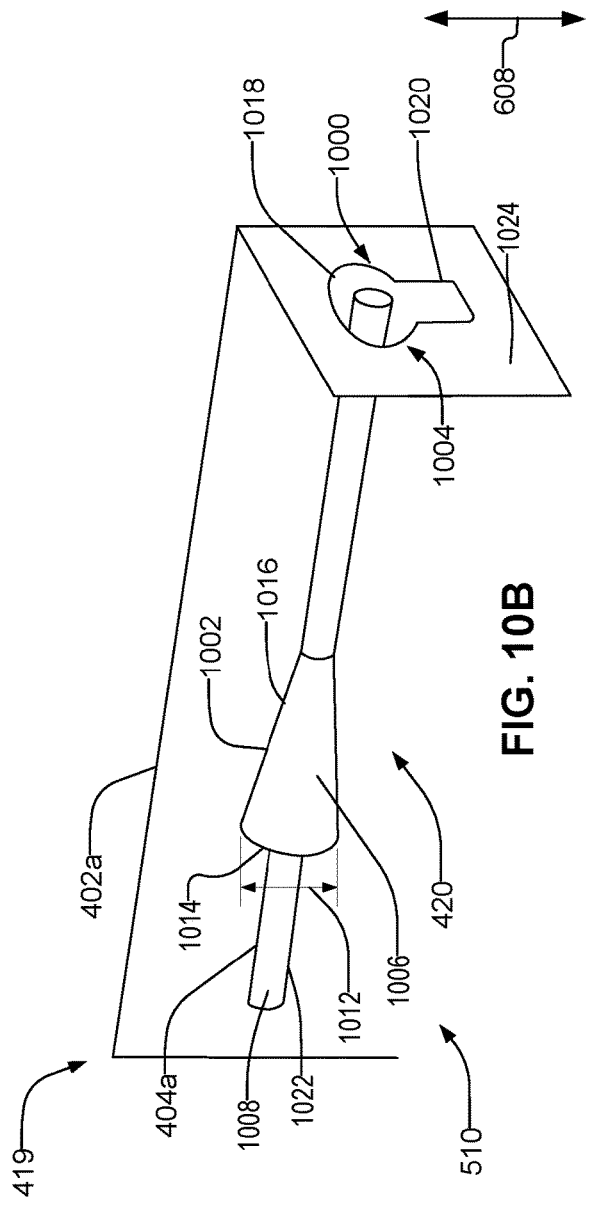
FIG. 10B is an assembled, perspective view of the example rail assembly of the example secondary barrier of FIGS. 1-9, and 10A.

FIG. 10A is a perspective, exploded view of the first rail assembly 419 and the lock 420 of FIG. 3. FIG. 10B is a perspective view of the first rail assembly 419 and the lock 420 shown in the unlocked position 510. The lock 420 of the illustrated example is formed (e.g., integrally formed) with the first rod 404a and the first track 402a. Specifically, the lock 420 is formed by a keyed interface 1000 defined by the first rod 404a and the first track 402a associated with the first rod 404a. The keyed interface 1000 includes a protrusion 1002 formed on the first rod 404a and an opening 1004 formed in the first track 402a. The protrusion 1002 of the illustrated example is an annular cylindrical or body 1006 formed on an outer surface 1008 of the first rod 404a. For example, the outer surface 1008 of the first rod 402a has a first diameter 1010 (FIG. 10A) and the protrusion 1002 has a second diameter 1012 (FIG. 10B) greater than the first diameter 1010. The protrusion 1002 of the illustrated example includes a stop 1014 (e.g., a flat surface) and a tapered portion 1016.

The opening 1004 includes a first aperture 1018 and a second aperture 1020. The first aperture 1018 and the second aperture 1020 form a key-hole shape. The first aperture 1018 is sized (e.g., has a diameter) to enable the protrusion 1002 to pass through the opening 1004. The second aperture 1020 is sized (has a diameter or area) to prevent passage of the protrusion 1002 through the opening 1004. Thus, the first aperture 1018 has a first area (e.g., diameter) that is greater than the first diameter 1010 of the first rod 404a and the second diameter 1012 of the protrusion 1002. Additionally, the second aperture 1020 has a second area (e.g., a diameter) that is less than the second diameter 1012 of the protrusion and greater than the first diameter 1010 of the first rod 404a. The second aperture 1020 enables the first rod 404a to move relative to the first track 402a in the direction 608 non-parallel (e.g., perpendicular to or vertical) relative to the longitudinal axis 416 of the first track 402a.

During operation, the opening 418 (FIGS. 4 and 5) of the first track 402a maintains or guides the first rod 404a in substantial alignment (e.g., coaxial alignment) with the first aperture 1018 until the protrusion 1002 exits the opening 418 of the first track 402a. As the protrusion 1002 exits the opening 418 of the first track 402a via the first aperture 1018, an end 1022 of the first rod 404a moves in the direction 608 and into the second aperture 1020 to the locked position 600. For example, gravity can automatically cause the end 1022 of the first rod 404a to move into the second aperture 1020 as the protrusion 1002 exits the first track 402a. In the locked position 600, the stop 1014 (e.g., a flat surface or an end of the protrusion 1002) engages an outer surface 1024 of the first track 402a, providing an interference to prevent movement of the first rod 404a toward the stowed position 230 along the longitudinal axis 416 of the first track 402a. The first track 402a prevents movement of the first rod 404a toward the stowed position 230 when the stop (e.g., an end) of the protrusion 1002 is in direct engagement with the outer surface 1024 of the first track 402a adjacent the second aperture 1020.

FIG. 11A is a cross-sectional side view of the first rail assembly 419 with the lock 420 shown in the unlocked position 510. FIG. 11B is a cross-sectional side view of the first rail assembly 419 shown with the lock 420 in the locked position 600. The lock 420 prevents movement of the secondary barrier 200 in the direction 602 parallel relative to the longitudinal axis 416 of the first track 402a when the secondary barrier 200 is in the deployed position 304. In operation, the first rod 404a is to allow movement of the secondary barrier 200 from the deployed position 304 to the stowed position 230 when the longitudinal axis 414 of the first rod 404a is substantially parallel and/or substantially aligned (e.g., exactly coaxially aligned or approximately coaxially aligned) relative to the longitudinal axis 416 of the first track 402a. The first rod 404a is to prevent movement of the secondary barrier 200 from the deployed position 304 to the stowed position 230 when the longitudinal axis 414 of the first rod 404a is not substantially parallel (e.g., is non-parallel or at an angle that is greater than between 1 degree and 5 degrees) relative to the longitudinal axis 416 of the first track 402a. When the protrusion 1002 of the first rod 1002a exits the opening 1004 of the first track 402a, the first rod 404a moves (e.g., automatically via gravity) in the direction 608 non-parallel (e.g., a downward direction in the orientation of FIG. 11B) relative to the longitudinal axis 416 of the first track 402a to move the lock 420 from the unlocked position 510 to the locked position 600. For example, the end 1022 of the first rod 404a moves from the first aperture 1018 to the second aperture 1020 of the opening 1004 (FIGS. 10A and 10B). In the locked position 600, the stop 1014 of the protrusion 1002 engages (e.g., directly engages) the outer surface 1024 of the first track 402a to prevent movement of the first rod 404a relative to the first track 402a.

To move the lock 420 to the unlocked position 510 and move the secondary barrier 200 to the stowed position 230, the first rod 404a is moved in the direction 608 (e.g., non-parallel or perpendicular) relative to the longitudinal axis 416 of the first track 402a. Specifically, the end 1022 of the first rod 404a is moved in upward in the orientation of FIGS. 11A and 11B to align (e.g., coaxially align) the longitudinal axis 414 of the first rod 404a and the longitudinal axis 416 of the first track 402a. In other words, the first rod 404a is repositioned to align with the first aperture 1018 of the opening 1004. In some examples, a user (e.g., a pilot, authorized personnel) can move the first rod 404a manually in the direction 608 to move the lock 420 from the locked position 600 to the unlocked position 510.

In some examples, the lock 420 can operate (e.g., be positioned) between the locked position 600 and the unlocked position 510 via a control system that includes a controller and a motor (e.g., an actuator) operatively coupled to the lock 420 that can move the secondary barrier 200 in the direction 602 (e.g., a sideways direction) via a transmission or gear train and/or move the first rod 404a in the direction 608 between the locked position 600 and the unlocked position 510. In some examples, the control system can automatically move the secondary barrier 200 to the stowed position 230 when the primary barrier 224 is in the closed position 226. In some examples, the control system can automatically move the secondary barrier 200 to the deployed position 304 when the primary barrier 224 moves to the open position 302. In some examples, the lock 420 can be an actuator (e.g., a hydraulic or air operated actuator) that can maintain or lock the secondary barrier 200 in the deployed position 304 and prevent unauthorized movement of the secondary barrier 200 toward the stowed position 230 when the primary barrier 224 (FIG. 2) is in the open position 302. In such examples, the lock 420 is not provided. Additionally, although the first rod 404a of the illustrated example can pivot to move the end 1022 in the direction 608 (e.g., a vertical direction) to move the lock 420 between the unlocked position 510 and the locked position 600, the first rod 404a maintains a substantially straight profile relative to the other rods 404 so that the lock 420 is discrete. Thus, only authorized personnel would be informed of which one of the rods 404 of the secondary barrier 200 includes the lock 420. In some examples, two or more rods 404 can include the lock 420. In some examples, a user input (e.g., a pin code via a keypad, facial recognition, etc.) can be provided to enable movement of the lock 420 from the locked position 600 to the unlocked position 510.

Figure 12B:
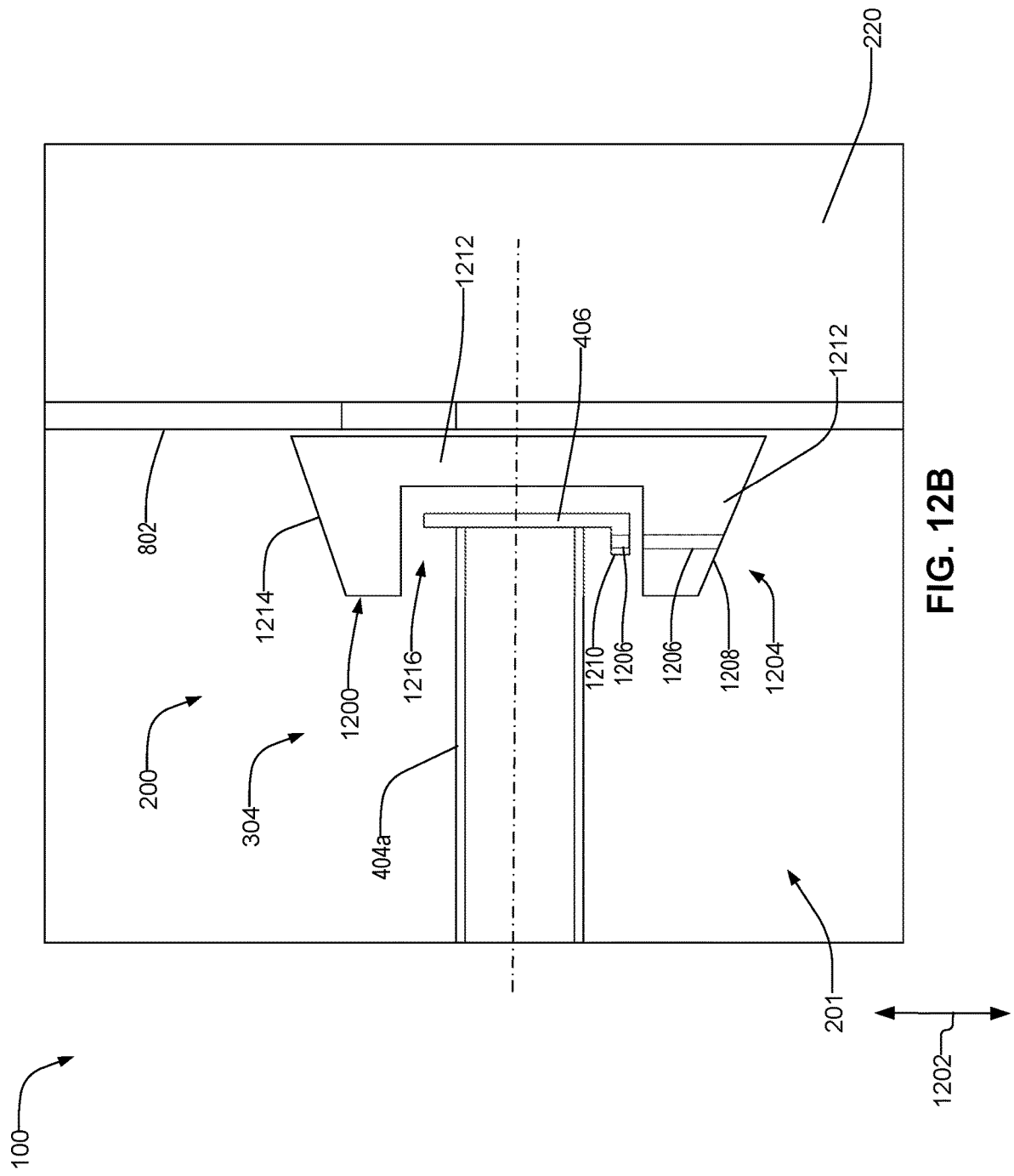
FIG. 12B is a side view of the example retainer of FIG. 12A.

FIG. 12A is a perspective view of the second monument 220 of the aircraft 100 of FIG. 1. FIG. 12B is a top view of FIG. 12A. Specifically, a retainer 1200 is provided on the second wall 802 of the second monument 220. For example, the retainer 1200 is fastened or attached to a frame of the second monument 220 via one or more fasteners, a weld, etc. The retainer 1200 of the illustrated example is to interface with the panel 406 to retain the panel 406 and, thus, the secondary barrier 200 in the deployed position 304. Additionally, the retainer 1200 prevents or restricts movement of the secondary barrier 200 in a fore-aft direction 1202 (e.g., a horizontal direction toward the primary barrier 224 of FIG. 2). For example, the fore-aft direction 1202 is substantially perpendicular (e.g., perfectly perpendicular or within 1 degree of perfect perpendicularity) relative to the direction 602 (e.g., the sideways direction) and the direction 608 (e.g., the vertical direction) of FIG. 6. Additionally, the retainer 1200 of the illustrated example restricts movement of the secondary barrier 200 toward the stowed position 230 when the retainer 1200 retains the secondary barrier 200 in the deployed position 304. In some examples, the retainer 1200 and the panel 406 provide a lock interface 1204. For example, the lock interface 1204 can include an aperture 1206 formed through a portion 1208 of the retainer 1200 and a lip 1210 of the panel 406 to receive a shackle of a lock (e.g., a pad lock). In some such examples, the lock interface 1204 is omitted. The retainer 1200 of the illustrated example includes a base 1212 and side walls 1214 protruding from the base 1212 to define a cavity 1216 that receives the panel 406.

FIG. 13 is a top view of a portion of an aircraft cabin 1301 of an aircraft 1302 implemented with another example secondary barrier 1300 (e.g., a gate) disclosed herein. In the illustrated example, the secondary barrier 1300 is a barrier module 1304 (e.g., a unitary unit or assembly). In some examples, the barrier module 1304 can be retrofit to aircraft in the field. The secondary barrier 1300 of the illustrated example includes a housing 1306 that couples (e.g., attaches) to a monument 1308 (e.g., the first monument 218, a wall, etc.) of the aircraft 1302. Thus, the secondary barrier 1300 of the illustrated example is a self-contained unit or assembly that can be installed in an aircraft by attaching the housing 1306 to a first wall 1309 of the aircraft cabin 1301. The secondary barrier 1300 prevents access to a primary barrier 224 via an aisle 222 when the primary barrier is an open position 302 and the secondary barrier 1300 is in a deployed position 1310. In the deployed position 1310, the secondary barrier 1300 extends from the housing 1306 across the aisle 222 and engages a second wall 1312 of a second monument 1314.

FIG. 14A is a perspective view of the secondary barrier 1300 shown in an example stowed position 1402. FIG. 14B is a perspective view of the secondary barrier 1300 shown in the example deployed position 1310. Referring to FIGS. 14A and 14B, the secondary barrier 1400 includes a plurality of tracks 1404 and a plurality of rods 1406 (e.g., defining a gate). The tracks 1404 of the illustrated example are positioned within the housing 1306. Specifically, the tracks 1404 of the illustrated example are slots or openings formed in the housing 1306 between a first side edge 1408 and a second side edge 1410 opposite the first side edge 1408. Respective ones of the rods 1406 slidably couple to respective ones of the tracks 1404. A panel 1412 is coupled to respective ends of the rods 1406. The panel 1412 enables movement of the rods 1406 relative to the tracks 1404 between the stowed position 1402 and the deployed position 1310. The rods 1406 in the stowed position 1402 are positioned entirely (e.g., completely) within the housing 1306 (e.g., such that the rods 1406 are not visible to a passenger in a passenger area of the aircraft 1302). The rods 1406 in the deployed position extend externally from the housing 1306. The panel 1412 is an extension of the housing 1306 and defines an outer wall 1414 of the housing 1306 when the panel 1412 is in the stowed position 1402. In some examples, the secondary barrier 1300 includes a lock (e.g., the lock 420) to prevent movement of the panel 1412 relative to the housing 1306 when the panel 1412 is in the deployed position 1310 and the lock is in a locked condition. The lock can be provided by a key interface (e.g., the key interface or lock 420 of FIG. 4) formed between a first rod 1406a and a first track 1404a. In some examples, operation of the secondary barrier 1300 can be controlled by a control system operatively coupled to the secondary barrier 1300.

Figure 15:
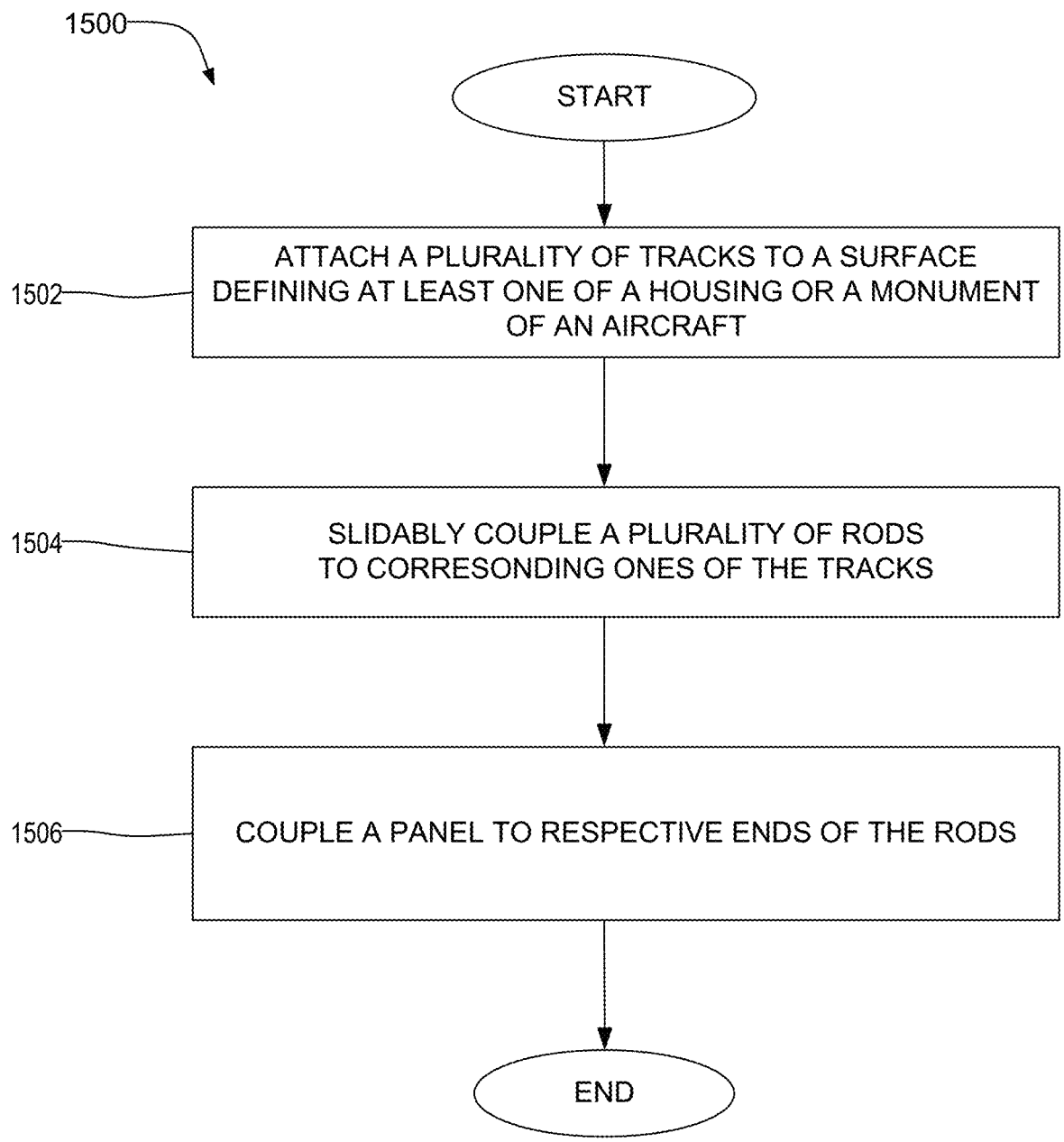
FIG. 15 is an example method of installing an example secondary barrier disclosed herein.

FIG. 15 is a flowchart representative of a method for forming or installing a secondary barrier in an aircraft. The installation process described can be performed during manufacturing of an aircraft or retrofitting existing aircraft in the field. The method begins at block 1502 by attaching a plurality of tracks 402 to a surface defining a cavity of at least one of a housing 1306 or a monument (e.g., the first monument 218) located in an aircraft cabin 201, 1301 of an aircraft 100, 1302. In some examples, the cavity is formed in the first monument 218 of the aircraft 100. In some examples, a plurality of slots or openings 1004 are formed in (e.g., the first wall 700) the first monument 218 to receive respective ones of the tracks 402. The tracks 402 can be attached via fasteners, brackets, welding, chemical fasteners, and/or any other fasteners. In some examples, the tracks 1404 can be integrally formed with the at least one of the housing 1306 or the first monument 218. After the tracks 402, 1404 are installed, a plurality of rods 404, 1406 are slidably coupled to corresponding ones of the tracks 402, 1404. (block 1504). A panel 406, 1412 is then coupled to respective ends of the rods 404, 1406 (block 1506). In some examples, a recess or a slot 502 is formed in the housing 1306 or the first monument 218 to enable the panel 406, 1412 to flush mount with the at least one of the housing 1306 or the first monument 218 when the secondary barrier 200, 1300 is in the stowed position 230, 1402. In some examples, a retainer 1200 is attached to the second wall 802 of a second monument 220 of a cabin 201 opposite the first monument 218.

Although each example secondary barrier 200 and 1300 disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. Features of one example are not mutually exclusive to features of another example. Instead, the scope of this disclosure encompasses any combination of any of the features. In some examples, the secondary barrier 200 can be used in conjunction with the secondary barrier 1300. In some examples, one or more of the components of the secondary barrier 200 (e.g., the retainer 1200, the lock 420, etc.) can be used with the secondary barrier 1300.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

From the foregoing, it will be appreciated that the disclosed secondary barriers improve aircraft safety while improving aircraft efficiency by reducing aircraft weight. Additionally, example secondary barriers disclosed herein improve aircraft aesthetics by providing a gate or door-like retractable structure that is not visible when the secondary barrier is in a stowed or open position. Unlike traditional secondary barriers, the secondary barriers disclosed herein do not include a frame that is visible when the secondary barrier is in a non-use position (e.g., an open or a stowed position).

Example 1 is a secondary barrier that includes a plurality of tracks to mount to a first monument in a cabin of an aircraft and a plurality of rods, where respective ones of the rods slidably engage respective ones of the tracks. The secondary barrier includes a panel coupled to respective ends of the rods. The rods to move relative to the tracks between a stowed position and a deployed position. The panel in the deployed position is to interface with a second monument in the cabin opposite the first monument. The rods are to extend between the first monument and the second monument when the secondary barrier is in the deployed position.

Example 2 includes the subject matter of Example 1, where the panel is to define an outer surface of the first monument when the secondary barrier is in the stowed position.

Example 3 includes the subject matter of any one of Examples 1 and 2, where the rods are to be positioned inside the first monument when the secondary barrier is in the stowed position.

Example 4 includes the subject matter of any one of Examples 1-3, where the tracks are fixed to a surface defining a cavity of the first monument.

Example 5 includes the subject matter of any one of Examples 1-4, where the panel is a metallic strip cap movable between the first monument and the second monument.

Example 6 includes the subject matter of any one of Examples 1-5, further including a retainer to couple to the second monument, the retainer to interface with the panel to retain the panel in the deployed position.

Example 7 includes the subject matter of any one of Examples 1-6, further including a lock movable between a locked position and an unlocked position, the lock to prevent movement of the secondary barrier from the deployed position to the stowed position when the lock is in the locked position.

Example 8 includes the subject matter of any one of Examples 1-7, where the lock is formed by a keyed interface defined by a first one of the rods and a first one of the tracks associated with the first rod.

Example 9 includes the subject matter of any one of Examples 1-8, where the keyed interface includes a protrusion formed on the first rod and an opening formed in the first track.

Example 10 includes the subject matter of any one of Examples 1-9, where the protrusion is an annular body defining a stop to engage the first track when the lock is in the locked position.

Example 11 includes the subject matter of any one of Examples 1-10, where the opening includes a first aperture and a second aperture, the first aperture to enable the protrusion to pass through the opening and the second aperture to enable the first rod to move relative to the first track in a direction non-parallel relative to a longitudinal axis of the first track.

Example 12 includes the subject matter of any one of Examples 1-11, where the first track prevents movement of the first rod toward the stowed position when the stop of the protrusion is in direct engagement with an outer surface of the first track adjacent the second aperture.

Example 13 includes the subject matter of any one of Examples 1-12, where the first aperture and the second aperture form a key-hole shape.

Example 14 is a secondary barrier including includes a gate to be slidably coupled to a first wall of an aircraft cabin. The gate is movable between a deployed position and a stowed position. The gate includes a plurality of rails and a panel. The rails to be positioned inside the first wall of the aircraft cabin when the gate is in the stowed position. A retainer is to couple to a second wall. The panel is to interface with the retainer when the gate is in the deployed position. The retainer is to restrict movement of the gate in a direction non-parallel relative to a longitudinal axis of the rails.

Example 15 includes the subject matter of Example 14, further including a lock to prevent movement of the gate in a direction parallel relative to the longitudinal axis when the gate is in the deployed position.

Example 16 includes the subject matter of any one of Examples 14-15, where the lock is integrally formed with one of the rails.

Example 17 includes the subject matter of any one of Examples 14-16, where the rails include a plurality of tracks and a plurality of rods, wherein the lock is formed by an interface between a first one of the tracks and a first one of the rods.

Example 18 includes the subject matter of any one of Examples 14-17, where the first rod is to allow movement of the gate from the deployed position to the stowed position when a first longitudinal axis of the first rod is substantially parallel relative to a first longitudinal axis of a first track, and the first rod is to prevent movement of the gate from the deployed position to the stowed position when the first longitudinal axis of the first rod is not substantially parallel relative to the first longitudinal axis of the first rod.

Example 19 is a method including includes attaching a plurality of tracks to a surface defining a cavity of at least one of a housing or a first monument of an aircraft cabin; slidably coupling a plurality of rods to corresponding ones of the tracks; and coupling a panel to respective ends of the rods.

Example 20 includes the subject matter of Example 19, further including attaching a retainer to a surface of a second monument of an aircraft cabin opposite the first monument.

Example 21 is a secondary barrier including a housing. A plurality of tracks are positioned within the housing and a plurality of rods, where respective ones of the rods to slidably couple to respective ones of the tracks. A panel is coupled respective ends of the rods. The panel is to cause the rods to move between a stowed position and a deployed position. The rods in the stowed position are to be positioned entirely within the housing. The rods in the deployed position are to extend externally from the housing. The panel is to form an outer wall of the housing when the panel is in the stowed position.

Example 22 includes the subject matter of Example 21, further including a lock provided by a key interface formed between a first one of the rods and a first one of the tracks, the lock to prevent movement of the panel relative to the housing when the panel is in the deployed position and the lock is in a locked position.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A secondary barrier comprising:
   a plurality of tracks to mount to a first monument in a cabin of an aircraft;
   a plurality of rods, respective ones of the rods to slidably engage respective ones of the tracks;
   a panel coupled to respective ends of the rods, the rods to move relative to the tracks between a stowed position and a deployed position, the panel in the deployed position to interface with a second monument in the cabin opposite the first monument, the rods to extend between the first monument and the second monument when the secondary barrier is in the deployed position; and
   a lock movable between a locked position and an unlocked position, the lock to prevent movement of the secondary barrier from the deployed position to the stowed position when the lock is in the locked position, the lock including a keyed interface provided by a first rod of the plurality of rods and a first track of the plurality of tracks associated with the first rod, the keyed interface including a protrusion formed on the first rod and an opening formed in the first track, the opening of the first track including a first aperture and a second aperture, the first aperture to enable the protrusion of the first rod to pass through the opening and the second aperture to enable the first rod to move relative to the first track in a direction non-parallel relative to a longitudinal axis of the first track.

2. The secondary barrier of claim 1, wherein the panel is to define an outer surface of the first monument when the secondary barrier is in the stowed position.

3. The secondary barrier of claim 1, wherein the rods are to be positioned inside the first monument when the secondary barrier is in the stowed position.

4. The secondary barrier of claim 1, wherein the tracks are fixed to a surface defining a cavity of the first monument.

5. The secondary barrier of claim 1, wherein the panel is a metallic strip cap movable between the first monument and the second monument.

6. The secondary barrier of claim 1, further including a retainer to couple to the second monument, the retainer to interface with the panel to retain the panel in the deployed position.

7. The secondary barrier of claim 1, wherein the protrusion is an annular body defining a stop to engage the first track when the lock is in the locked position.

8. The secondary barrier of claim 7, wherein the first track prevents movement of the first rod toward the stowed position when the stop of the protrusion is in direct engagement with an outer surface of the first track adjacent the second aperture.

9. The secondary barrier of claim 7, wherein the first aperture and the second aperture form a key-hole shape.

10. A secondary barrier for use with an aircraft, the secondary barrier comprising:
    a gate to be slidably coupled to a first wall of an aircraft cabin, the gate movable between a deployed position and a stowed position, the gate including a plurality of rails and a panel, the rails to be positioned inside the first wall of the aircraft cabin when the gate is in the stowed position, the rails including a plurality of tracks and a plurality of rods;
    a retainer to couple to a second wall, the panel to interface with the retainer when the gate is in the deployed position, the retainer to restrict movement of the gate in a direction non-parallel relative to a longitudinal axis of the rails; and
    a lock integrally formed with one of the rails to prevent movement of the gate in a direction parallel relative to the longitudinal axis when the gate is in the deployed position, the lock formed by an interface between a first one of the tracks and a first one of the rods, the first one of the rods to allow movement of the gate from the deployed position to the stowed position when a first longitudinal axis of the first one of the rods is substantially parallel relative to a first longitudinal axis of a first one of the tracks, and the first one of the rods to prevent movement of the gate from the deployed position to the stowed position when the first longitudinal axis of the first one of the rods is not substantially parallel relative to the first longitudinal axis.

11. A method comprising:

attaching a plurality of tracks to a surface defining a cavity of at least one of a housing or a first monument of an aircraft cabin;

slidably coupling a plurality of rods to corresponding ones of the tracks;

coupling a panel to respective ends of the rods; and movably coupling a first rod to a first track to enable the first rod to move between a first position in which the first rod is substantially parallel relative to a first longitudinal axis of the first track and a second position in which the first rod is not substantially parallel relative to the first longitudinal axis of the first track, the first rod in the first position to enable the panel to move between a stowed position and a deployed position, the first rod in the second position to prevent the panel from moving from the deployed position to the stowed position.

12. The method of claim 11, further including attaching a retainer to a surface of a second monument of an aircraft cabin opposite the first monument.

13. The method of claim 11, further including providing a recess in the at least one of the housing or the first monument to enable the panel to flush mount with the at least one of the housing or the first monument when the panel is in the stowed position.

14. The secondary barrier of claim 10, wherein the panel is to define an outer surface of a first monument of an aircraft when the secondary barrier is in the stowed position.

15. The secondary barrier of claim 14, wherein the rods are to be positioned inside the first monument when the secondary barrier is in the stowed position.

16. The secondary barrier of claim 15, wherein the tracks are fixed to a surface defining a cavity of the first monument.

17. The secondary barrier of claim 14, wherein the first monument includes a recess to enable the panel to flush mount with the first monument when the gate is in the stowed position.

18. The secondary barrier of claim 14, wherein the panel is a metallic strip cap movable between the first monument and a second monument opposite the first monument.

19. The secondary barrier of claim 18, wherein the retainer is coupled to the second monument, the retainer to retain the panel in the deployed position.

20. The secondary barrier of claim 10, wherein the interface of the lock is a keyed interface provided by the first one of the rods and the first one of the tracks associated with the first one of the rods, the keyed interface including a protrusion formed on the first one of the rods and an opening formed in the first one of the tracks, the opening of the first one of the tracks including a first aperture and a second aperture, the first aperture to enable the protrusion of the first one of the rods to pass through the opening and the second aperture to enable the first one of the rods to move relative to the first one of the tracks in a direction non-parallel relative to the longitudinal axis of the first one of the tracks.

* * * * *